US007102766B2

(12) United States Patent
Asakawa et al.

(10) Patent No.: US 7,102,766 B2
(45) Date of Patent: Sep. 5, 2006

(54) IMAGE FORMING APPARATUS WHICH CONTROLS IMAGE FORMING CONDITIONS FOR A RECORDING MATERIAL THAT IS WIDER THAN STANDARD-SIZE RECORDING MATERIAL BASED ON INPUT SIZE INFORMATION

(75) Inventors: Minoru Asakawa, Tokyo (JP); Yoshinao Kitahara, Tokyo (JP); Yoshihisa Kamata, Tokyo (JP); Chikatsu Suzuki, Tokyo (JP); Junji Sato, Tokyo (JP)

(73) Assignee: Konica Corporation, Tokyo (JP)

( * ) Notice: Subject to any disclaimer, the term of this patent is extended or adjusted under 35 U.S.C. 154(b) by 1035 days.

(21) Appl. No.: 09/813,213

(22) Filed: Mar. 20, 2001

(65) Prior Publication Data

US 2001/0026375 A1 Oct. 4, 2001

(30) Foreign Application Priority Data

Mar. 24, 2000 (JP) ............................ 2000-085398

(51) Int. Cl.
*G06F 15/00* (2006.01)

(52) U.S. Cl. .................. 358/1.13; 271/9.01; 271/9.06; 399/393

(58) Field of Classification Search ............... 271/9.07, 271/9.06, 9.05, 9.04, 9.01, 8.1; 399/388, 399/385, 387, 389, 390, 391, 393; 358/1.2, 358/1.3, 1.9, 1.13, 401, 304
See application file for complete search history.

(56) References Cited

U.S. PATENT DOCUMENTS

| | | | | |
|---|---|---|---|---|
| 5,247,370 | A * | 9/1993 | Takaoka | 358/440 |
| 5,581,344 | A * | 12/1996 | Makita | 399/45 |
| 2002/0027667 | A1 * | 3/2002 | Takami et al. | 358/1.2 |

* cited by examiner

*Primary Examiner*—King Y. Poon
(74) *Attorney, Agent, or Firm*—Frishauf, Holtz, Goodman & Chick, P.C.

(57) ABSTRACT

The present invention concerns an image-forming apparatus for forming an image on a recording material, an area of which is wider than that of a standard fixed-form size having a predetermined fixed-form size, based on an original image recorded on a document. The image-forming apparatus includes a plurality of recording material storing devices in each of which the recording material can be stored; an input section to establish information in regard to a size of the recording material stored in one of the recording material storing devices, as setting information corresponding to each of the recording material storing devices; a memory section to store the setting information corresponding to each of the recording material storing devices; and a control section to determine controlling conditions based on the setting information and to control operations of the image-forming apparatus based on the controlling conditions; wherein the setting information include the standard fixed-form size and longitudinal and lateral lengths of the recording material.

19 Claims, 14 Drawing Sheets

SHEET CONVEYANCE CONDITION BASED ON APPROXIMATE FIXED-FORM SIZE

SHEET CONVEYANCE CONDITION BASED ON APPROXIMATE FIXED-FORM SIZE

CONTROL FOR IMAGE FORMING EMPLOYING ATS FUNCTION

IMAGE FORMING APPARATUS WHICH CONTROLS IMAGE FORMING CONDITIONS FOR A RECORDING MATERIAL THAT IS WIDER THAN STANDARD-SIZE RECORDING MATERIAL BASED ON INPUT SIZE INFORMATION

BACKGROUND OF THE INVENTION

The present invention relates to an image forming apparatus.

As an image forming apparatus, there have so far been provided a copying machine wherein images such as character strings or patterns or a combination thereof described on a document placed on or fed to a platen glass (document glass) are copied on a transfer sheet, a printer wherein images which are made on a word processor of a personal computer and are the same as the foregoing are printed on a transfer sheet, and a facsimile machine wherein images which are transmitted through communication lines and are the same as the foregoing are printed. Further, there is also known the so-called "compound machine" wherein the functions of the aforesaid copying machine, printer and facsimile machine are provided in an apparatus.

Incidentally, with regard to a conventional image forming apparatus, there have been provided those capable of conducting image forming on a transfer sheet (so-called "wide sheet") that is slightly larger than a standard fixed-form size in terms of area. When conducting image forming on the wide sheet, control conditions for an image forming apparatus have usually been changed to the conditions which are suitable for the wide sheet.

This change of control conditions is necessary because of a size of the wide sheet which is larger than the standard fixed-form size as stated above. The control condition to be changed includes, for example, a control condition for transfer sheet conveyance in an image forming apparatus.

In the past, however, the control conditions used for a wide sheet have not always been optimum. For the conveyance control condition for a wide sheet, for example, a transfer sheet in a "certain size" that is greater than a fixed-form size is imagined, and the conveyance control condition for this "certain size" has been used as a substitute. Namely, in this case, the conveyance control condition for a wide sheet is nothing but one that is prepared as a fixed condition determined in advance.

The wide sheet, however, is not usually fixed in its size, and it varies variously in terms of size. Under the aforesaid fixed condition, therefore, it is not possible to cope with all of these various wide sheets sufficiently and properly. Accordingly, it has been difficult to form images with high quality and to conduct highly productive image forming.

Further, in the conventional image forming apparatus disregarding existence of the aforesaid various wide sheets, no attention has been paid to "setting" which can cope with the diversity mentioned above.

SUMMARY OF THE INVENTION

The present invention has been achieved in view of the circumstances stated above, and its object is to provide an image forming apparatus wherein setting is possible for a recording material which is larger than a certain standard fixed-form size in terms of area and has an optional size, and with which it is possible to conduct image forming with high quality or image forming capable of attaining high productivity, based on the aforesaid setting.

Accordingly, to overcome the cited shortcomings, the abovementioned object of the present invention can be attained by image-forming apparatus described as follow.

(1) An image-forming apparatus, for forming an image on a recording material, an area of which is wider than that of a standard fixed-form size having a predetermined fixed-form size, based on an original image recorded on a document, comprising: a plurality of recording material storing devices, in each of which the recording material can be stored; an input section to establish information in regard to a size of the recording material, which is stored in one of the recording material storing devices, as setting information corresponding to each of the recording material storing devices; a memory section to store the setting information corresponding to each of the recording material storing devices; and a control section to determine controlling conditions based on the setting information and to control operations of the image-forming apparatus based on the controlling conditions; wherein the setting information include the standard fixed-form size and longitudinal and lateral lengths of the recording material.

(2) The image-forming apparatus of item 1, wherein the input section establishes a type of the recording material as the setting information, corresponding to each of the recording material storing devices.

(3) The image-forming apparatus of item 1, wherein, at a first step, the standard fixed-form size is inputted into the input section as the setting information, and, at a second step, the longitudinal and lateral lengths of the recording material are inputted into the input section as the setting information.

(4) The image-forming apparatus of item 3, wherein, when the longitudinal and lateral lengths, inputted at the second step, are shorter than those of the standard fixed-form size, inputted at the first step, the input section rejects the inputting operation of the longitudinal and lateral lengths.

(5) The image-forming apparatus of item 1, further comprising: a displaying section to display the setting information in a manner such that the setting information clearly corresponds to each of the recording material storing devices.

(6) The image-forming apparatus of item 5, wherein the displaying section displays information in regard to the standard fixed-form size and information of size larger than the standard fixed-form size.

(7) An image-forming apparatus, for forming an image on a recording material, an area of which is wider than that of a standard fixed-form size having a predetermined fixed-form size, based on an original image recorded on a document, comprising: a plurality of recording material storing devices, in each of which the recording material can be stored; an input section to establish information in regard to a size of the recording material, which is stored in one of the recording material storing devices, as setting information corresponding to each of the recording material storing devices; a memory section to store the setting information corresponding to each of the recording material storing devices; and a control section to determine conveyance controlling conditions, by which a conveyance mode of the recording material, fed from one of the recording material storing devices, is determined, based on the setting information, and to control operations of the image-forming apparatus based on the conveyance controlling conditions; wherein the setting information include the standard fixed-form size and longitudinal and lateral lengths of the recording material, and the conveyance controlling conditions are determined based on the longitudinal and lateral lengths of the recording material.

(8) The image-forming apparatus of item 7, wherein the input section establishes a type of the recording material as the setting information, corresponding to each of the recording material storing devices.

(9) The image-forming apparatus of item 7, wherein the control section calculates an approximate fixed-form size, which does not exceed the longitudinal and lateral lengths, but is approximate to the longitudinal and lateral lengths, and the control section calculates the conveyance controlling conditions based on other conveyance controlling conditions corresponding to the approximate fixed-form size.

(10) The image-forming apparatus of item 9, wherein the other conveyance controlling conditions corresponding to the approximate fixed-form size are given in advance.

(11) The image-forming apparatus of item 9, wherein the approximate fixed-form size is separately determined with respect to each of longitudinal and lateral directions.

(12) The image-forming apparatus of item 9, wherein the control section compares the standard fixed-form size with a most approximate fixed-form size, which does not exceed the longitudinal and lateral lengths, but is most approximate to the longitudinal and lateral lengths, to determine the standard fixed-form size as the approximate fixed-form size when the standard fixed-form size is equal to the most approximate fixed-form size, or to determine the most approximate fixed-form size as the approximate fixed-form size when the standard fixed-form size is smaller than the most approximate fixed-form size.

(13) The image-forming apparatus of item 9, wherein the control section calculates the conveyance controlling conditions based on difference values between longitudinal and lateral lengths of the recording material and longitudinal and lateral lengths of the approximate fixed-form size in longitudinal and lateral directions.

(14) The image-forming apparatus of item 13, wherein the control section calculates the conveyance controlling conditions by compensatively adding the difference values to the other conveyance controlling conditions corresponding to the approximate fixed-form size.

(15) The image-forming apparatus of item 14, wherein the control section calculates the conveyance controlling conditions in respect to a PPM interval control by utilizing the difference values in the longitudinal direction.

(16) The image-forming apparatus of item 14, wherein the control section calculates the conveyance controlling conditions in respect to an ADU circulation control by utilizing the difference values in the longitudinal direction.

(17) The image-forming apparatus of item 14, wherein the control section calculates the conveyance controlling conditions in respect to a controlling operation for detecting a positional deviation of the recording material by utilizing the difference values in the lateral direction.

(18) An image-forming apparatus, for forming an image on a recording material, an area of which is wider than that of a standard fixed-form size having a predetermined fixed-form size, based on an original image recorded on a document, comprising: a plurality of recording material storing devices, in each of which the recording material can be stored; an input section to establish information in regard to a size of the recording material, which is stored in one of the recording material storing devices, as setting information corresponding to each of the recording material storing devices; a memory section to store the setting information corresponding to each of the recording material storing devices; a control section to determine controlling conditions based on the setting information and to control operations of the image-forming apparatus based on the controlling conditions; and an automatic magnification selecting section to automatically determine a magnification factor, utilized for forming the image on the recording material, from a size of the recording material and a size of the document, with respect to every size of the document; wherein the setting information include the standard fixed-form size and longitudinal and lateral lengths of the recording material, and the magnification factor is determined based on the standard fixed-form size in respect to the recording material.

(19) The image-forming apparatus of item 18, wherein the input section establishes a type of the recording material as the setting information, corresponding to each of the recording material storing devices.

(20) An image-forming apparatus, for forming an image on a recording material, an area of which is wider than that of a standard fixed-form size having a predetermined fixed-form size, based on an original image recorded on a document, comprising: a plurality of recording material storing devices, in each of which the recording material can be stored; an input section to establish information in regard to a size of the recording material, which is stored in one of the recording material storing devices, as setting information corresponding to each of the recording material storing devices; a memory section to store the setting information corresponding to each of the recording material storing devices; a control section to determine controlling conditions based on the setting information and to control operations of the image-forming apparatus based on the controlling conditions; and an automatic storing-device switching section to automatically switch from a feeding path of the recording material fed from a current recording material storing device to another feeding path of the recording material fed from another recording material storing device, which stores recording materials having the same conditions as those of recording materials stored in the current recording material storing device, wherein, during consecutive image-forming operations for the recording materials continuously feeding from one of the recording material storing section, the automatic storing-device switching section automatically switches from the feeding path to the other feeding path, when the recording materials stored in the current recording material storing device have run out, and when the other recording material storing device currently stores the recording materials having the same conditions; wherein the setting information include the standard fixed-form size and longitudinal and lateral lengths of the recording material, and the same conditions include full coincidence in the standard fixed-form size and longitudinal and lateral lengths in respect to the recording material.

(21) The image-forming apparatus of item 20, wherein the input section establishes a type of the recording material as the setting information, corresponding to each of the recording material storing devices.

Further, to overcome the abovementioned problems, other image-forming apparatus, embodied in the present invention, will be described as follow:

To overcome the aforesaid problems, the invention is represented by the following structures.

Structure 1

An image forming apparatus forming on a recording material an image described on a document, wherein there are provided a plurality of recording material storing means each storing recording materials, an input means that sets information concerning types and/or sizes of the recording material stored in each of the recording material storing means as setting information for each of the recording material storing means, a memory means that stores the setting information, while coping with each of the recording material storing means, and a control means which determines control conditions concerning the present apparatus based on the setting information and operates, simultaneously with the determination, the present apparatus based on the control conditions, and forms the image on the recording material fed from the recording material storing means storing the setting information.

Structure 2

An image forming apparatus that is basically the same in terms of structure as the image forming apparatus in Structure 1, wherein the recording material is one that is greater in terms of area than a standard fixed-form size having a prescribed fixed-form size, and information relating to the size constituting the setting information is composed of the standard fixed-form size and longitudinal and lateral lengths of the recording material.

Structure 3

The image forming apparatus according to the Structure 2, wherein the setting information is set through the input means in the order of the standard fixed-form size first and the longitudinal and lateral lengths secondly.

Structure 4

The image forming apparatus according to the Structure 3, wherein when the longitudinal and lateral lengths which are smaller than the standard fixed-form size are inputted, the input means rejects the input.

Structure 5

The image forming apparatus according to the Structure 2, wherein there is provided a display means that displays the setting information in a form that clarifies correspondence with each of the recording material storing means.

Structure 6

The image forming apparatus according to the Structure 5, wherein the display is composed of a display relating to the standard fixed-form size and a display greater than the standard fixed-form size.

Structure 7

An image forming apparatus that is basically the same in terms of structure as the image forming apparatus in Structure 2, wherein the control means stipulates an occasion to correspond to a conveyance control condition that determines a conveyance mode for the recording material fed from the recording material storing means in the present apparatus, and the conveyance control condition is determined based on the longitudinal and lateral lengths.

Structure 8

The image forming apparatus according to the Structure 7, wherein the conveyance control condition is determined based on a conveyance control condition relating to the approximate fixed-form size that does not exceed and is approximate to the longitudinal and lateral lengths.

Structure 9

The image forming apparatus according to the Structure 8, wherein the conveyance control condition relating to the approximate fixed-form size is given in advance.

Structure 10

The image forming apparatus according to the Structure 8 or the Structure 9, wherein the approximate fixed-form size is determined separately concerning each of the longitudinal direction and the lateral direction.

Structure 11

The image forming apparatus according to either one of the Structure 8–Structure 10, wherein the control means compares the standard fixed-form size with most approximate fixed-form size which does not exceed and is most approximate to the longitudinal and lateral lengths, and when the standard fixed-form size is equal to the most approximate fixed-form size, the standard fixed-form size is determined as the approximate fixed-form size, while when the standard fixed-form size is smaller than the most approximate fixed-form size, the most approximate fixed-form size is determined as the approximate fixed-form size.

Structure 12

The image forming apparatus according to either one of the Structure 8–Structure 11, wherein the conveyance control condition is determined by using a difference value relating to each of the longitudinal direction and the lateral direction obtained from the longitudinal and lateral lengths of the recording material and from the longitudinal and lateral lengths concerning the approximate fixed-form size.

Structure 13

The image forming apparatus according to the Structure 12, wherein the conveyance control condition is determined with a basis that the difference value is added to the conveyance control condition concerning the approximate fixed-form size for correction.

Structures 14, 15 and 16

The image forming apparatus according to the Structure 13, wherein a conveyance control condition concerning PPM interval control is obtained by using a difference value relating to the longitudinal direction (Structure 14), a conveyance control condition concerning ADU circulation control is obtained by using a difference value relating to the longitudinal direction (Structure 15), and a conveyance control condition concerning control of detection for deviation of recording material position by using a difference value relating to the lateral direction (Structure 16).

Structure 17

An image forming apparatus that is basically the same in terms of structure as the image forming apparatus in Structure 2, wherein there is provided an automatic magnification selection means that determines the magnification automatically from a size of the recording material and a size of the document when conducting image forming on the recording material for each size of the document, and the magnification is determined based on the standard fixed-form size relating to the recording material.

Structure 18

An image forming apparatus that is basically the same in terms of structure as the image forming apparatus in Structure 2, wherein there is provided an automatic storing deck switching means which automatically conducts switching to the feeding of recording materials having the same conditions from another recording material storing means, when there exists another recording sheet storing means that stores recording sheets having the same condition as the recording material after the recording materials stored in the recording material storing means have used up in the case of continuous image forming for the recording materials fed continuously from the recording material storing means.

BRIEF DESCRIPTION OF THE DRAWINGS other objects and advantages of the present invention will become apparent upon reading the following detailed description and upon reference to the drawings in which.

Figure 9:
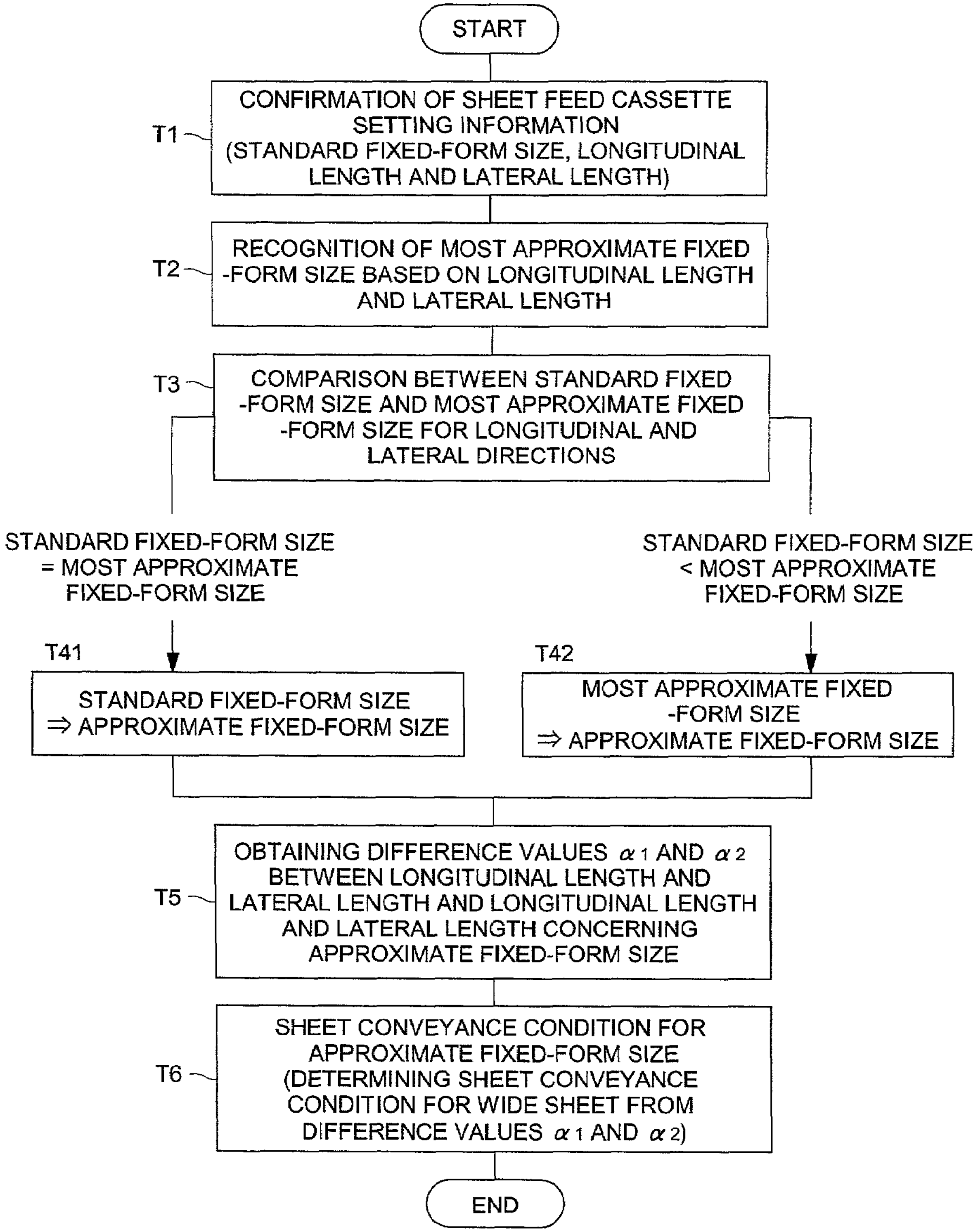
FIG. 9 is a flow chart determining sheet conveyance control conditions relating to a wide sheet.
Figure 10:
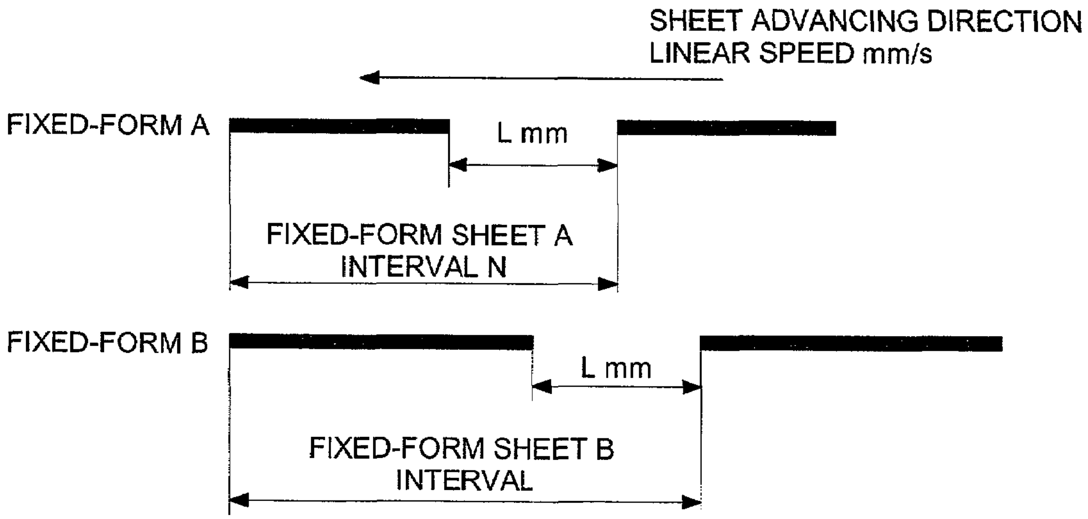
Figure 10:
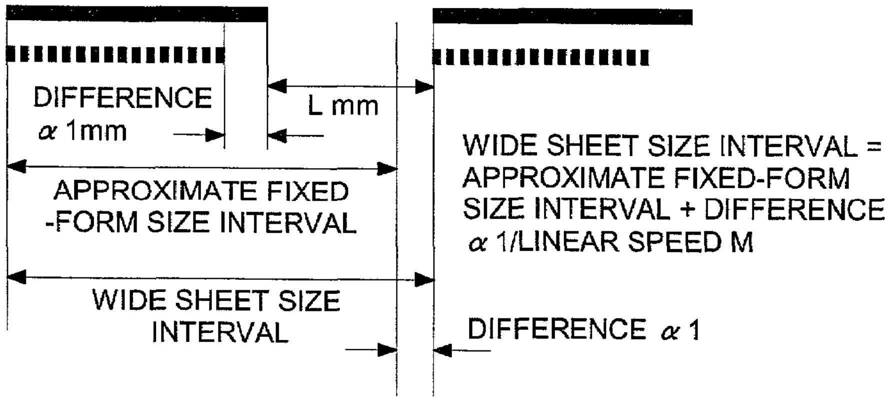
Figure 11:
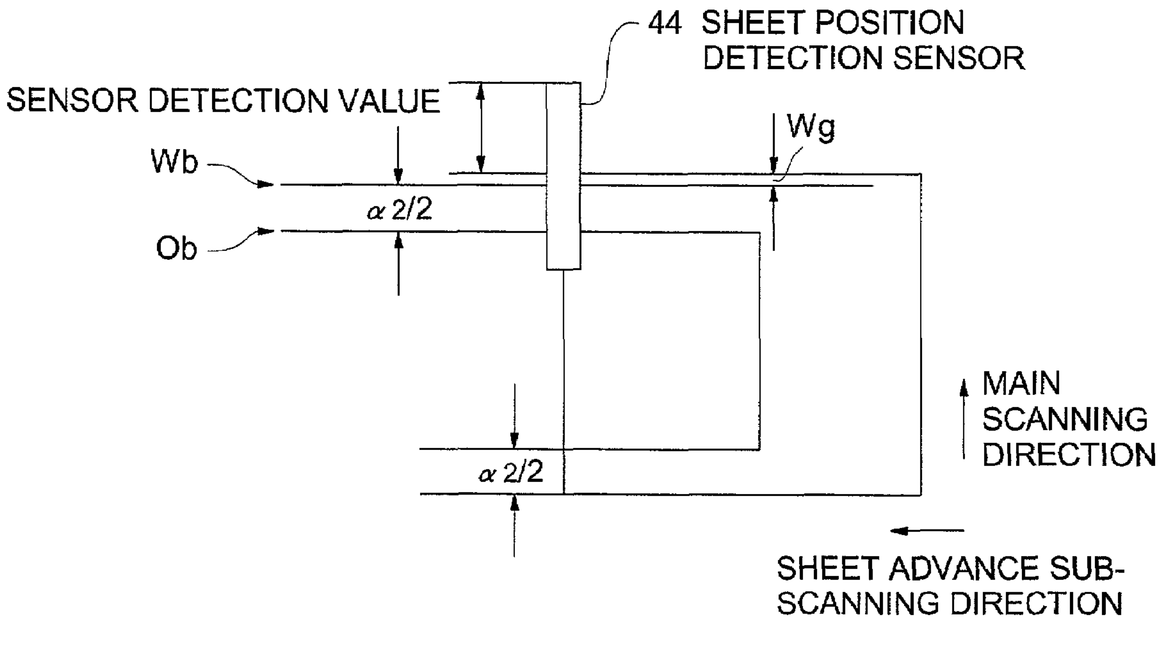
Figure 12:
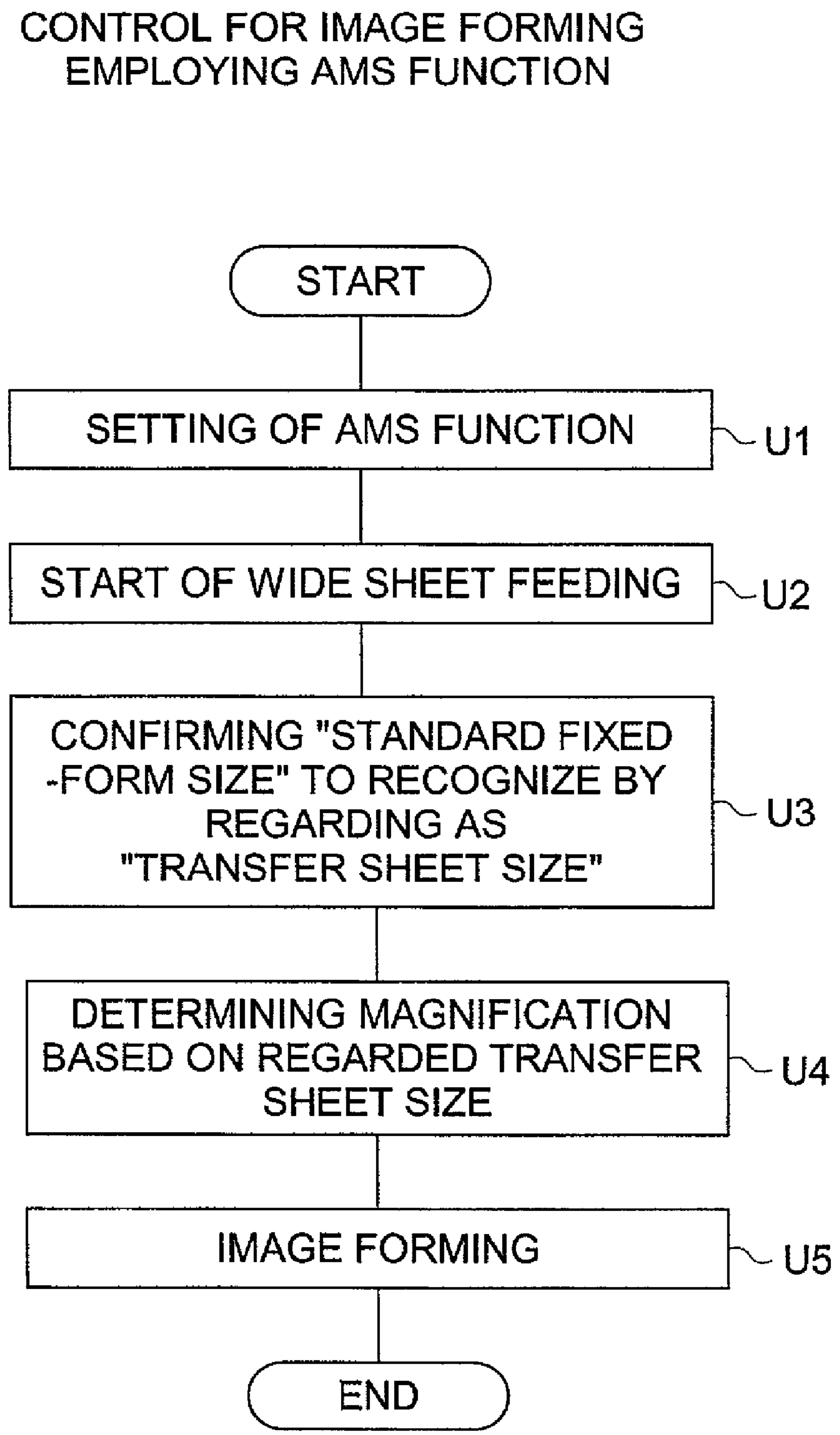
Figure 13:
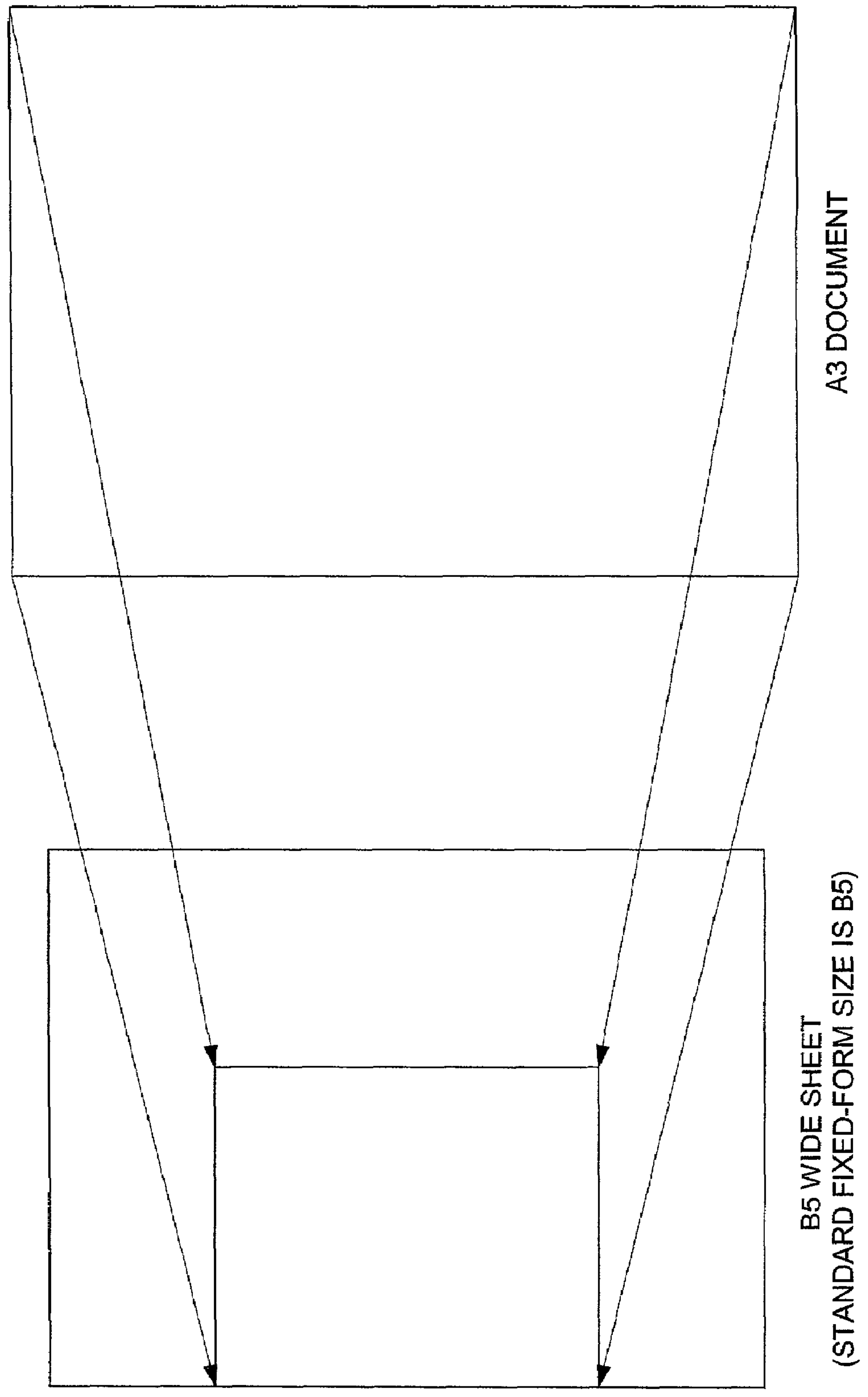
Figure 14:
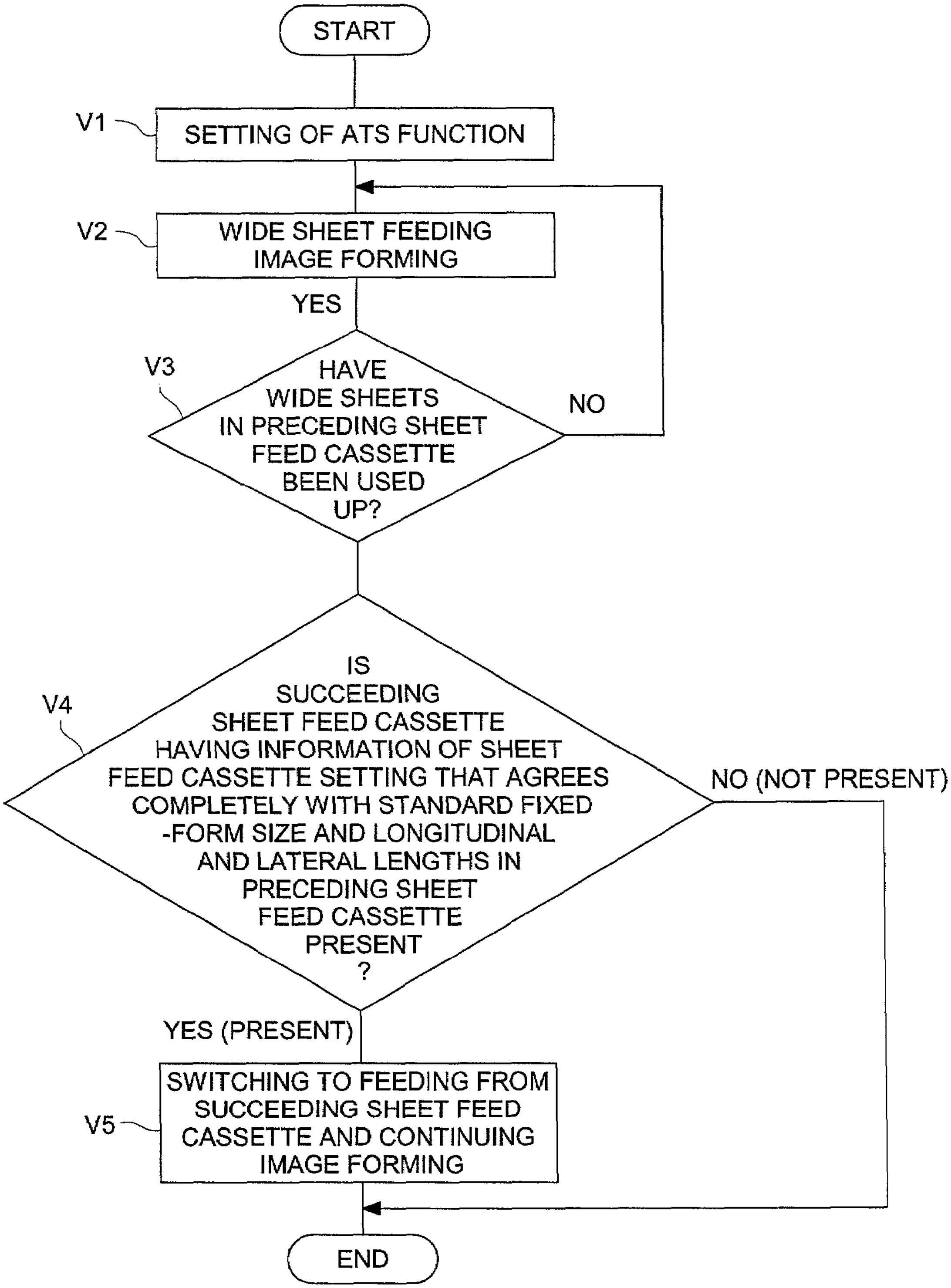

FIGS. 10(*a*) and 10(*b*) are illustrations that conceptually illustrate how PPM interval control conditions relating to a wide sheet are determined in step T6 in FIG. 9;

FIG. 11 is an illustration that conceptually illustrates how detection control conditions for transfer sheet position deviation for a wide sheet are determined in step T6 in FIG. 9;

FIG. 12 is a flow chart showing how image forming utilizing AMS function for a wide sheet is conducted;

FIG. 13 is an illustration showing conceptually how concrete image forming is conducted in step U5 in FIG. 14; and FIG. 14 is a flow chart showing how image forming utilizing ATS function for a wide sheet is conducted.

DETAILED DESCRIPTION OF THE PREFERRED EMBODIMENT

Figure 1:
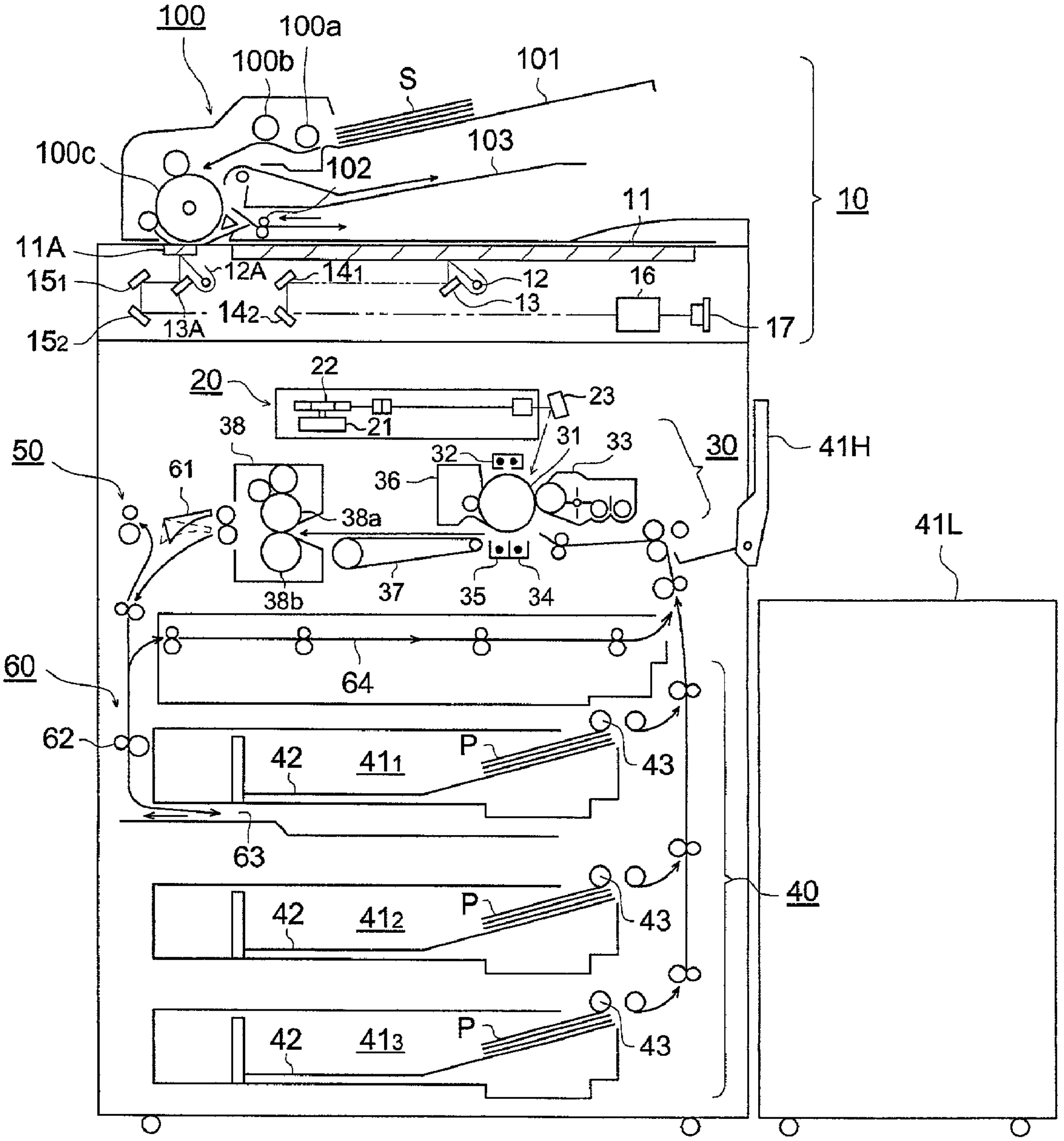
FIG. 1 is a schematic diagram showing an example of structure of a copying apparatus relating to the present embodiment.

An embodiment of the invention will be explained as follows, referring to the drawings. FIG. 1 is a schematic diagram showing an example of the structure of a copying apparatus (image forming apparatus) relating to the present embodiment. In FIG. 1*i* a copying apparatus is roughly composed of image reading section, image writing section 20, image forming section 30, transfer sheet conveyance section 40, transfer sheet ejection section 50 and transfer sheet reversing section 60, and further, outer sheet feed means 41L is provided to be mounted on the apparatus main body. Incidentally, "a transfer sheet" mentioned in the present embodiment corresponds to "a recording material" mentioned in the invention.

The image reading section 10 is a section which reads characters or patterns described on document S with light emitted from a light source as optical information, and converts them into electrical information.

The document S is placed directly on platen glass 11 so that document surface (the surface on which images are formed) of the document S may face the surface of the platen glass (document glass) 11. Light source 12 projects light on the document surface. Light arriving at the document surface turns into light (information) including information of images on the document surface and is reflected on that surface to arrive at mirror 13. Incidentally, light source 12 and mirror 13 are arranged to be capable of moving along platen glass 11 to scan the entire document surface Sf.

Further, the image forming apparatus in the present embodiment is equipped with automatic two-sided document conveyance section (RADF) 100 serving as an automatic document feeding means. The automatic two-sided document conveyance section 100 is arranged so that a bundle of plural documents S laminated on document placing stand 101 is separated to be fed out by feed rollers 100*a* and 100*b*, and is supplied onto platen glass 11A through roller 100*c*. Fixed light source 12A and mirror 13A are provided below the platen glass 11A (in this case, the light source 12A and the mirror 13A move toward the left side in FIG. 1 to be at a standstill). Due to these constitution, document surfaces Sf can be read continuously with regard to a bundle of plural documents S, in the same way as in the foregoing.

In addition to the foregoing, it is also possible to read two sides including the surface and the reverse of document S, in the constitution of the automatic two-sided document conveyance section 100 and platen glass 11A shown in FIG. 1. In this case, document S whose one side is read by light source 12A is fed out to the right side in the drawing by reversing roller 102 after the reading is completed, and then, the reversing roller 102 is reversed to send the document S while it is wound around roller 100*c*, so that the other side of the document S may face the surface of platen glass 11A. Incidentally, the document S supplied from the automatic two-sided document conveyance section 100 and is read by light source 12A is laminated successively on sheet ejection tray 103.

Now, the optical information relating to document surface read by light sources 12 or 12A as stated above is reflected repeatedly on mirrors 14, and 142 or 15, and 152 and arrives at CCD image-pickup device 17 through image forming optical system 16. The CCD image-pickup device 17 is provided with a photoelectric surface (not shown) on which a plurality of pixels each having a photoelectric conversion function are arranged and optical information including image information on the document surface are received by these plural pixels and are converted into electric information.

The image writing section 20 is a station which radiates (writes) a laser beam controlled based on the electric information obtained in the aforesaid manner on photoreceptor drum 31 which will be described later and thereby forms an electrostatic latent image on the photoreceptor drum 31.

The aforesaid electric information including image information obtained by converting optical information on the document surface is used for conducting control relating to a laser beam emitted from an unillustrated semiconductor laser. The laser beam controlled based on the electric information is projected on polygon mirror 22 whose central portion is connected to driving motor 21 to be made capable of rotating, and the laser beam reflected on the polygon mirror is radiated on photoreceptor drum 31 through reflection mirror 23. In this case, when the polygon mirror 22 rotates while it is reflecting the laser beam, scanning on the photoreceptor drum 31 in its axial direction is conducted by irradiation by the laser beam. Due to this irradiation by the laser beam, an electrostatic latent image based on the electric information is formed on the photoreceptor drum 31.

The image forming section 30 is a section where an image is formed on transfer sheet P based on an electrostatic latent image formed on the photoreceptor drum 31.

An entire surface of the photoreceptor drum 31 is charged electrically by charging section 32 as a preliminary work before an electrostatic latent image is formed on the photoreceptor drum 31 through irradiation by a laser beam as stated above. In developing section 33, charged toner particles are stuck to the electrostatic latent image so that it is visualized. In transfer section 34, toner particles are transferred and stuck on the surface of transfer sheet P conveyed separately, and thereby, a toner image is formed on the surface of the transfer sheet P.

After that, for the photoreceptor drum 31 and thereon, separation section 35 separates transfer sheet P stuck to the photoreceptor drum 31, and cleaning section 36 removes toner remaining on the photoreceptor drum 31 after the transfer operation to create the cleaned surface, so that uniform charging may be conducted by the charging section 32 and an electrostatic latent image may be formed by irradiation with a laser beam again. On the other hand, the transfer sheet P is sent to fixing section 38 through conveyance mechanism 37. In the fixing section 38, heat and pressure are applied to the transfer sheet P by heat rollers 38*a* and 38*b* to fix the toner images transferred, thus, images are formed. After this, the transfer sheet P is ejected to the outside of the image forming apparatus through plural rollers provided on transfer sheet ejection section 50. At this point of time, "copying" of images concerning the document surface onto the surface of transfer sheet P is completed. Incidentally, the sheet ejection stated above can be conducted by reversing from inside to outside.

Incidentally, in the image forming apparatus of the present embodiment, the transfer of toner images from the photoreceptor drum 31 to transfer sheet P can be carried out not only for one side but also for the other side of the transfer sheet P. In this case, the transfer sheet P finished in terms of copying on its one side is conveyed to transfer sheet reversing section 60. Guide section 61 switches a conveyance path for transfer sheet P between the transfer sheet reversing section 60 and the transfer sheet ejection section 50. When the guide section 61 switches so that transfer sheet P is conveyed downward in the diagram, the transfer sheet P is fed out to reversing section 63 through reversing roller 62. Then, under the state wherein the transfer sheet P is fed out toward the reversing section 63 by a predetermined quantity, the reversing roller 62 is reversed to convey the transfer sheet P to reversing conveyance path 64. After that, the transfer sheet P passes through the path 64 and arrives again at the upstream side of the photoreceptor drum 31. In this case, the surface of the transfer sheet P facing the photoreceptor drum 31 is one opposite to the surface subjected to transfer before passing the transfer sheet reversing section 60. Incidentally, in general, when forming images actually on the transfer sheet P reversed as stated above, new image information is written on the photoreceptor drum 31 by the image writing section 20 in advance.

Transfer sheet conveyance section 40 is a section which conveys transfer sheet P to the image forming section 30, especially to its photoreceptor drum 31.

Transfer sheets P are stacked and placed on tray 42 provided on each of a plurality of sheet feed cassettes (recording material storing means) 41 constructed stepwise (three sheet feed cassettes 411, 412 and 413 in the drawing). These sheet cassettes 41 are constructed to be taken in an apparatus main body when sending transfer sheet P to the image forming section 30, namely when forming images, and to be drawn out of the apparatus main body when replenishing transfer sheets P. Further, with regard to each of the sheet feed cassettes $\mathbf{41}_1$, $\mathbf{41}_2$ and $\mathbf{41}_3$, it is possible to store transfer sheets P in various sizes in accordance with classification of sizes such as storing "A4" in the first sheet feed cassette $\mathbf{41}_1$ and storing "A3" in the second sheet feed cassette $\mathbf{41}_2$, or it is possible to store in accordance with classification of types such as storing thick sheets in A4 size in the first sheet feed cassette $\mathbf{41}_1$ and storing thin sheets in the same size in the second sheet feed cassette $\mathbf{41}_2$.

Under this situation, when a size and a type of transfer sheet P are specified in the course of execution of copying, for example, tray 42 in the corresponding sheet feed cassette 41 is lifted upward in the drawing accordingly, and thereby, the surface of transfer sheet P comes in contact with a circumferential surface of feed-out roller 43 and that roller 43 rotates, thus, the transfer sheet P is fed out of sheet feed cassette 41. After that, the transfer sheet P is conveyed toward the image forming section 30 by the structure of a plurality of conveyance rollers shown in FIG. 1.

Incidentally, in this case, it is general that transfer sheet P is not conveyed continuously from sheet feed cassette 41 to photoreceptor drum 31 and there are set the conveyance control conditions for making transfer sheet P to wait temporarily for a period of a prescribed interval (PPM interval) at a place between these sheet feed cassettes 41 and photoreceptor drum 31. The reason for the foregoing is that it is necessary to make adjustment between preceding transfer sheet P and succeeding transfer sheet P when conducting continuous copying. Incidentally, let it be assumed that "a place" where transfer sheet P waits temporarily is called "a second sheet feed section" in the present embodiment.

In the present embodiment, in addition to the sheet feed cassette 41 having the aforesaid construction, there are provided, as a means to feed transfer sheet P, bypass feed tray 41H and outer sheet feed means 41L (so-called LCT) 41L wherein a large quantity of transfer sheets P can be stored in advance, as shown in FIG. 1. The former makes it possible to cope with an occasion where image forming on a special transfer sheet or on an OHP is conducted in particular, while, the latter makes it possible to conduct continuous image forming for a large quantity of transfer sheets P.

Incidentally, in FIG. 1, though there is shown an occasion wherein there are provided five sheet feed means in total including three sheet feed cassettes 41, bypass feed tray 41H and outer sheet feed means 41L, the number of sheet feed means which can be provided is not limited in principle. Namely, any number of sheet feed means can be provided.

Figure 2:
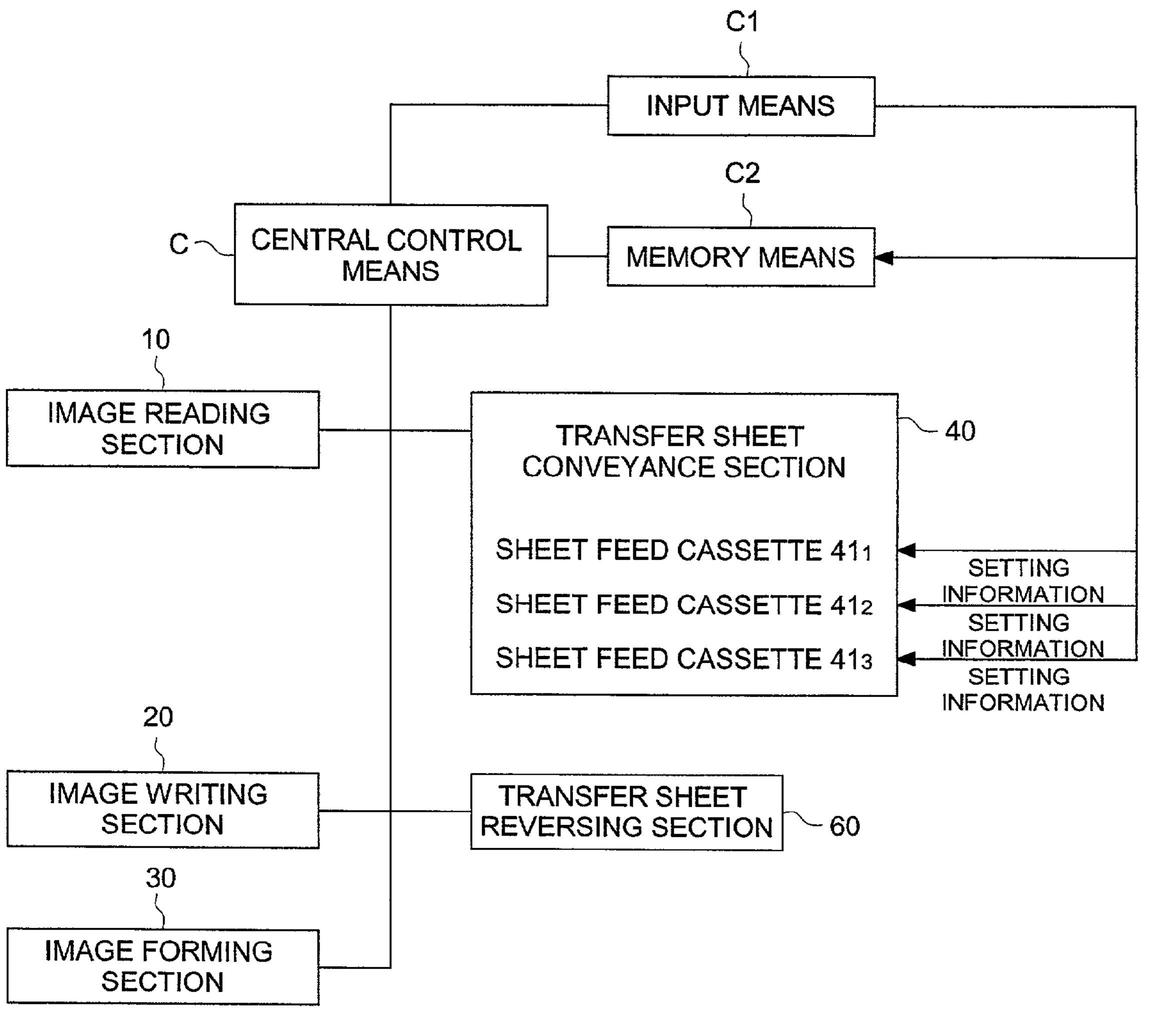
FIG. 2 is a schematic diagram showing an example of electrical structure of a copying apparatus relating to the present embodiment.

Next, an example of electric structure of an apparatus concerning to a copying apparatus having the aforesaid mechanical structure will be explained as follows, referring to FIG. 2. It is arranged so that each mechanism in each of the image reading section 10, the image writing section 20, the image forming section 30, the transfer sheet conveyance section 40 and the transfer sheet reversing section 60 all stated above is governed and controlled by central control means (control means) C as shown in FIG. 2. Further, on this central control means C, there are provided input means C1 and memory means C2.

The central control means C in this case makes it possible, as is explained in detail again in the explanation of effects described later, to form images on transfer sheet P whose size in terms of area is greater than transfer sheet P having a certain prescribed fixed-form size. In this case, "a certain prescribed fixed-form size" (hereinafter referred to as "fixed-form size") means both of the size following the standards in Japan such as, for example, A4, A3, B4 and B5, and the size which is generally regarded as a fixed-form size in foreign countries such as 8.5×11 inch and 11×17 inch. Incidentally, the latter sometimes is called "fixed-form special size" in particular.

"The transfer sheet whose area is greater" than a transfer sheet having a fixed-form size of this type comes under one that is generally called "a wide sheet". In other words, the "wide sheet" can be regarded as a transfer sheet form stipulated as one having a longitudinal length and a lateral length each being extended to be longer than a standard size (hereinafter referred to as "a standard fixed-form size") representing a certain fixed-form size.

If an A4 size image is formed on wide sheet of this type, namely, on the wide sheet on which an A4 size is a standard fixed-form size, for example, a margin equivalent to the aforesaid extended length is to be produced on the wide sheet. This margin is used as a portion to be cut in the binding process after the image forming.

Incidentally, a length for the "extension" stated above basically depends on a standard made independently by each paper mill in general. Namely, there is a possibility that "A3 wide sheet" of a paper mill A is different in terms of a size (or area) from that of a paper mill B. Namely, when a "wide sheet" is mentioned, its size (or area) is not determined univocally, even when their standard fixed-form sizes agree with each other. In short, it can be said that a size of a wide sheet is almost optional.

Furthermore, in description of the drawings in the present specification, symbol "P" is used to represent both "a transfer sheet" and "a wide sheet".

Figure 3:
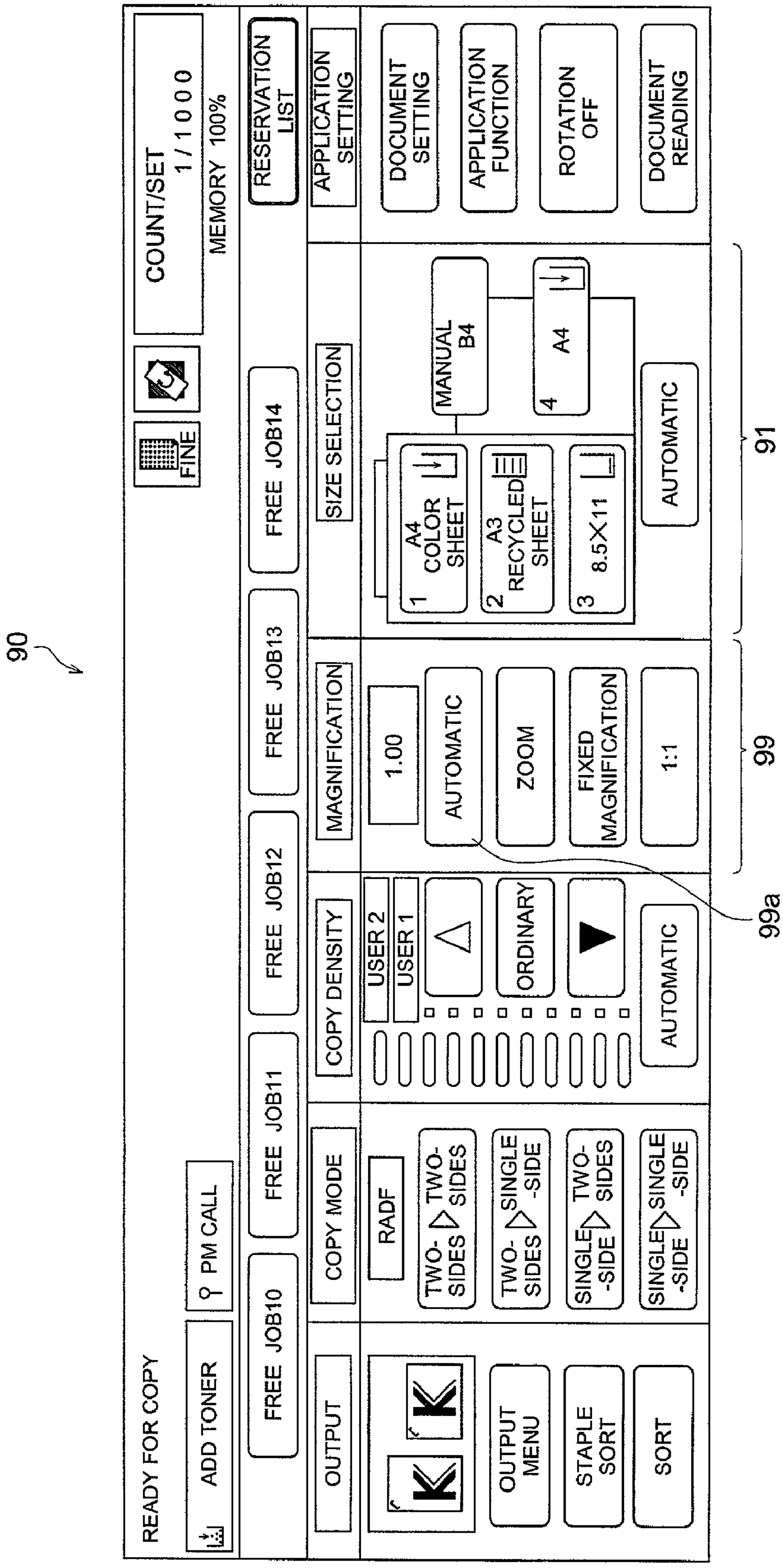
FIG. 3 is a schematic diagram showing an example of concrete structure of an input means relating to the present embodiment.

As a concrete construction of input means C1, it is possible to employ one equipped with known touch panel 90 such as that shown, for example, in FIG. 3. A user of an apparatus can change copy density, magnification and output setting for transfer sheet P, by pressing and specifying various windows indicated on the touch panel 90. Incidentally, in such a case, the input means C1 also serves as a display means that transmits setting conditions on the apparatus to an operator.

Further, memory means C2 stores setting information (hereinafter referred to as "sheet feed cassette setting information") about a sheet type (type information) and/or a size (size information) of transfer sheet P in each of sheet feed cassettes 41 in the aforesaid transfer sheet conveyance section 40, by making them to correspond to each of the sheet feed cassettes $\mathbf{41}_1$, $\mathbf{41}_2$ and $\mathbf{41}_3$, as shown in FIG. 2. For example, if "A4 ordinary sheet" is stored in sheet feed cassette $\mathbf{41}_1$ and "A4 wide and thick sheet" is stored in sheet feed cassette $\mathbf{41}_2$, these are stored as attribution information peculiar to each of sheet feed cassettes $\mathbf{41}_1$ and $\mathbf{41}_2$.

Incidentally, setting operations and storing operations in the foregoing are conducted through the aforesaid input means C1 as will be described later. Further, in the course of actual image forming, central control means C refers to the aforesaid sheet feed cassette setting information, and starts sheet feeding from the selected sheet feed cassette 41, by selecting sheet feed cassette 41 storing transfer sheet P to be fed having a sheet type and a size based on a size of the document placed on the platen glass 11, for example, or based on the direct selection specification through input means C1.

Then, after the start of sheet feeding, the central control means C conducts actual image forming, by determining, based on the aforesaid sheet feed cassette setting information, the control conditions for determining the conveyance mode for transfer sheet P in transfer sheet conveyance section 40 and transfer sheet reversing section 60 shown in FIG. 1 or FIG. 2 (conveyance control condition, hereinafter referred to simply as "sheet conveyance condition") and the control conditions which are necessary for operating a copying apparatus in image forming. The "sheet conveyance condition" in this case means, concretely for example, the control conditions relating to the rotation start timing for feed-out roller 43 determining the feed-out timing for each transfer sheet P when transfer sheets P are fed out continuously in transfer sheet conveyance section 40, the rotating speed of reversing roller 62 in transfer sheet reversing section 60 and to the degree of pressure contact between heat roller 38*a* and heat roller 38*b* in image forming section 30. If such feed conveyance condition for transfer sheet P which is in "A4 size and ordinary sheet" is made to be different from that for transfer sheet P which is in "B5 size and thick sheet", for example, it is possible to conduct image forming which complies with characteristics of transfer sheet P and is of high quality.

Incidentally, in the present embodiment, appropriate sheet conveyance conditions corresponding to each of sheet types or fixed-form sizes such as the sheet conveyance conditions corresponding to "thick sheet" and the sheet conveyance conditions corresponding to "A4 size", for example are prepared in memory means C2 in advance.

Figure 4:
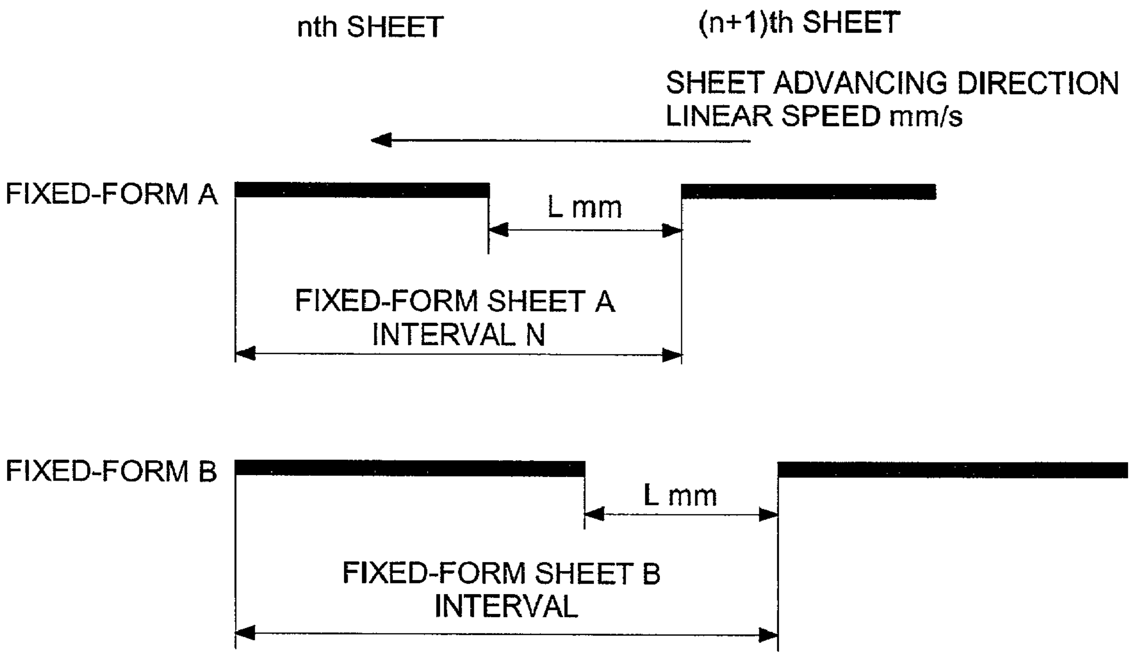
FIG. 4 is an illustration showing an example of a sheet conveyance condition.

For example, to be more concrete, with regard to the rotation timing of feed-out roller 43 in the continuous feeding out of transfer sheets P, the control (for example, PPM interval control) is executed so that distance L (mm) between the trailing edge of $n^{th}$ transfer sheet P fed out and the leading edge of $(n+_l)^{th}$ transfer sheet P may be constant continually independently of the size of transfer sheet P (in the drawing, fixed-form A and fixed-form B), as shown in FIG. 4. Namely, the control conditions (rotation timing) for feed out roller 43 which make the aforesaid distance L (mm) to be constant continually for both "A4 size" and "B5 size" are prepared in advance for each of the "A4 size" and "B5 size".

From the foregoing, when starting sheet feeding from sheet feed cassettes 41 storing respectively "A4 size and thick sheet" and "11×17 inch size and ordinary sheet", for example, and conveying them, sheet feed conditions corresponding to the "A4 size and thick sheet" and "11×17 inch size and ordinary sheet" are selected (determined) from memory means C2, and these conditions are applied for controlling the copying apparatus.

Incidentally, in addition to the foregoing, the memory means C2 is used also for the occasion to store temporarily image information relating to the document surface which has been read by the image reading section 10 stated above.

An action and effect of a copying apparatus of the aforesaid construction, especially, an action and effect focusing on setting for wide sheet P or on the state of control in actual image forming will be explained as follows, referring to flow charts shown in FIGS. 5, 9, 12 and 14.

(Wide Sheet Setting for Sheet Feed Means)

In the present embodiment, it is possible to set the aforesaid sheet feed cassette setting information relating to a wide sheet for sheet feed cassette 41 as stated above, and procedures or methods for the setting will be explained in this paragraph.

Figure 5:
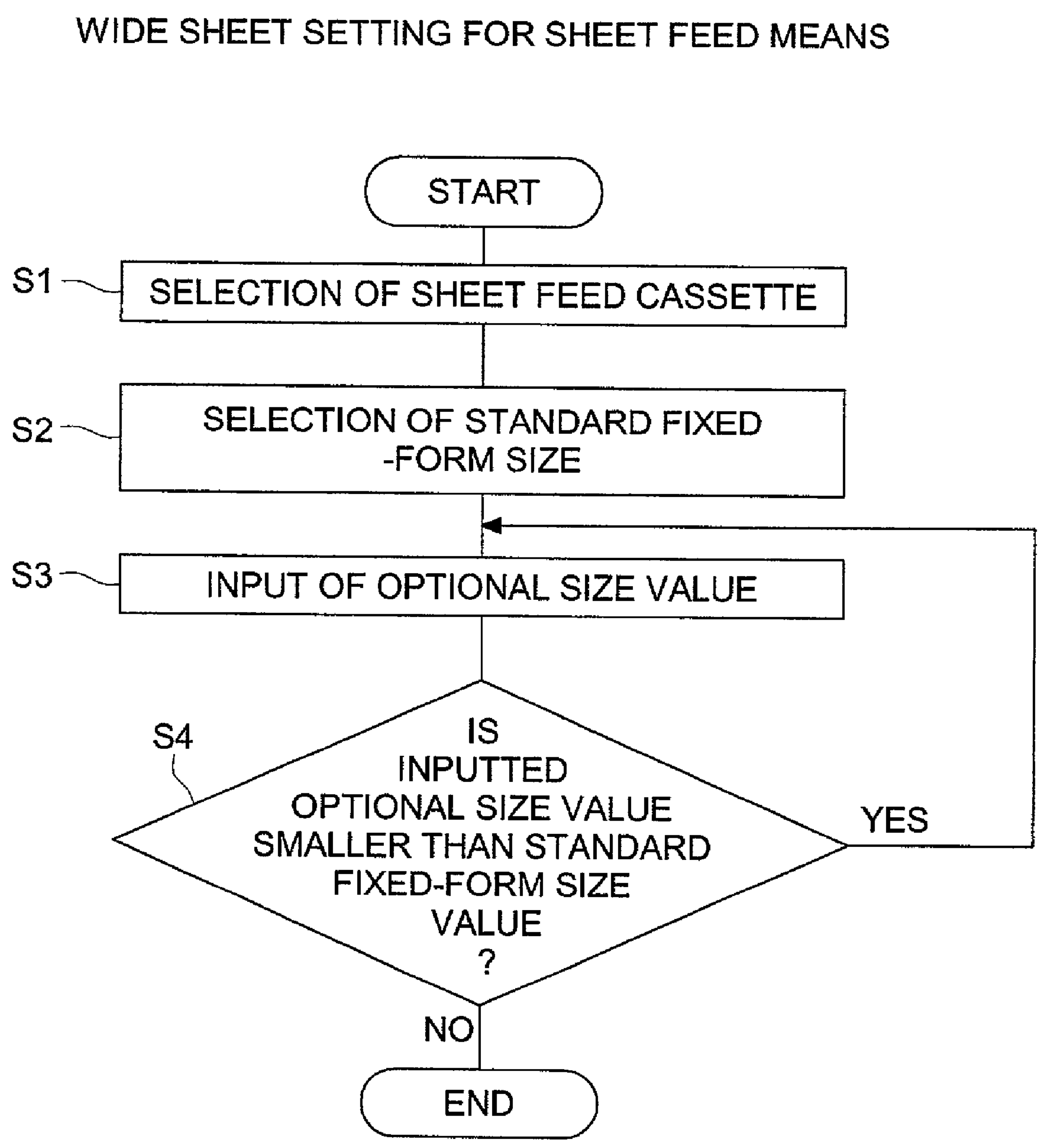
FIG. 5 is a flow chart showing an example of procedures of operation to conduct setting of a wide sheet for a sheet feed means.

First, size selection area 91 shown in FIG. 3 is specified as shown in step S1 in FIG. 5, and sheet feed cassette 41 on which sheet feed cassette setting information is to be set is selected. In FIG. 3, it is possible to select also from bypass feed tray 41H and outer sheet feed means 41L, in addition to each of sheet feed cassettes $41_1$, $41_2$ and $41_3$. In this case where setting especially for sheet feed cassette $41_1$ is explained as an example, a screen shown in FIG. 6 is displayed by the aforesaid specification and selection for the sheet feed cassette 411.

Figure 6:
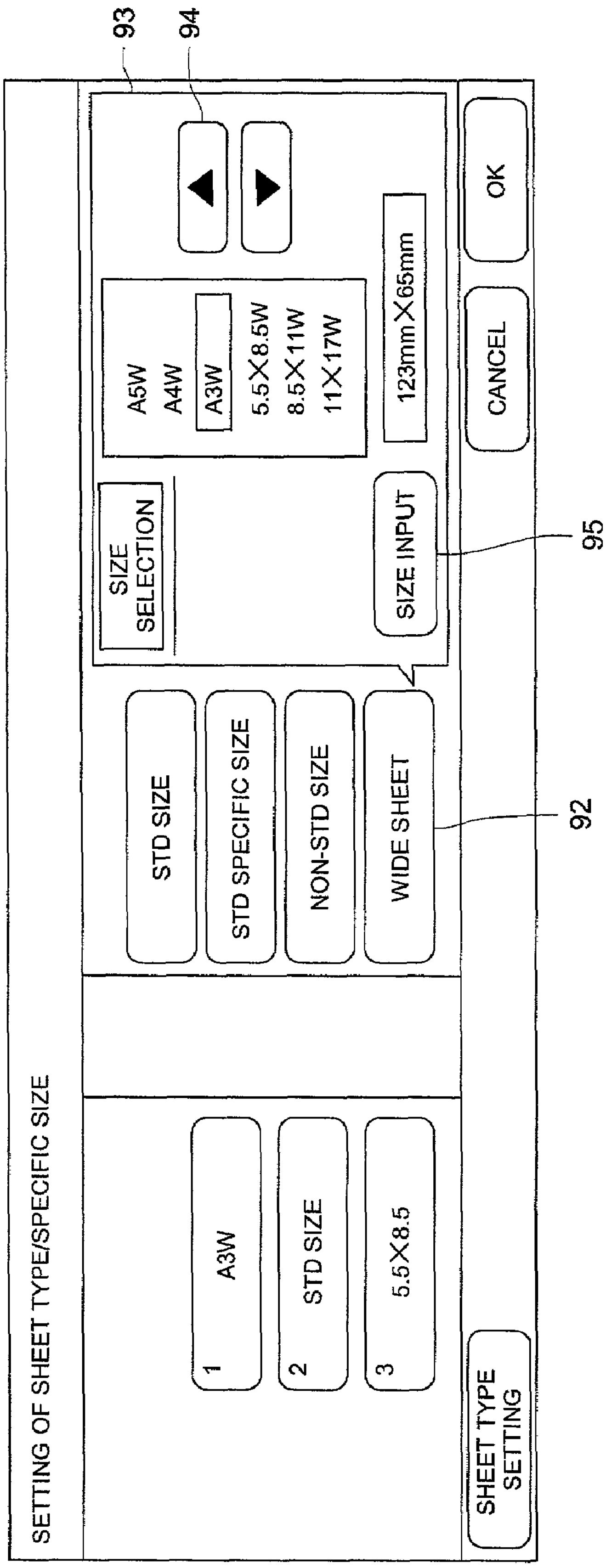
FIG. 6 is an illustration showing an example of an input screen used for setting of a wide sheet on a sheet feed means.

Next, as shown in step S2 in FIG. 5, size setting pop-up area 93 is indicated by specifying wide sheet button 92 in FIG. 6, and then, an optional one is selected (selection of standard fixed-form size) from standard fixed-form sizes shown on the area 93 by utilizing arrow button 94 located at the rightmost position in the drawing. To be concrete, the standard fixed-form size shown reversely is "selected" by the arrow button 94.

Incidentally, in FIG. 6, "A5", "A4", "A3", "5.5×8.5 (inch)", "8.5×11 (inch)" and "11×17 (inch)" are respectively shown as a standard fixed-form size, and by specifying the arrow button 94, it is possible to indicate (reversely) other standard fixed-form sizes (for example, "B5" and others) on the screen and to select them.

Figure 7:
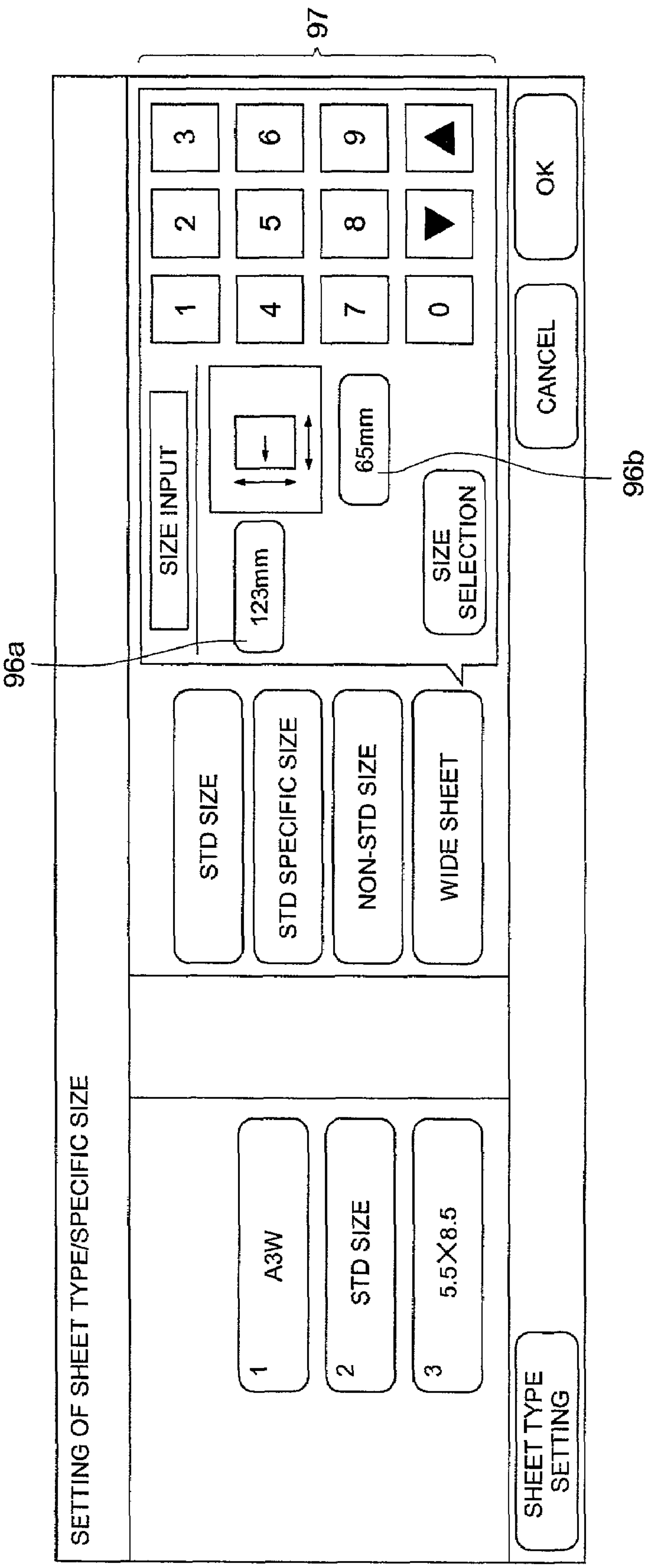
FIG. 7 is an illustration showing an example of an input screen used for setting of a wide sheet, following FIG. 6.
Figure 8:
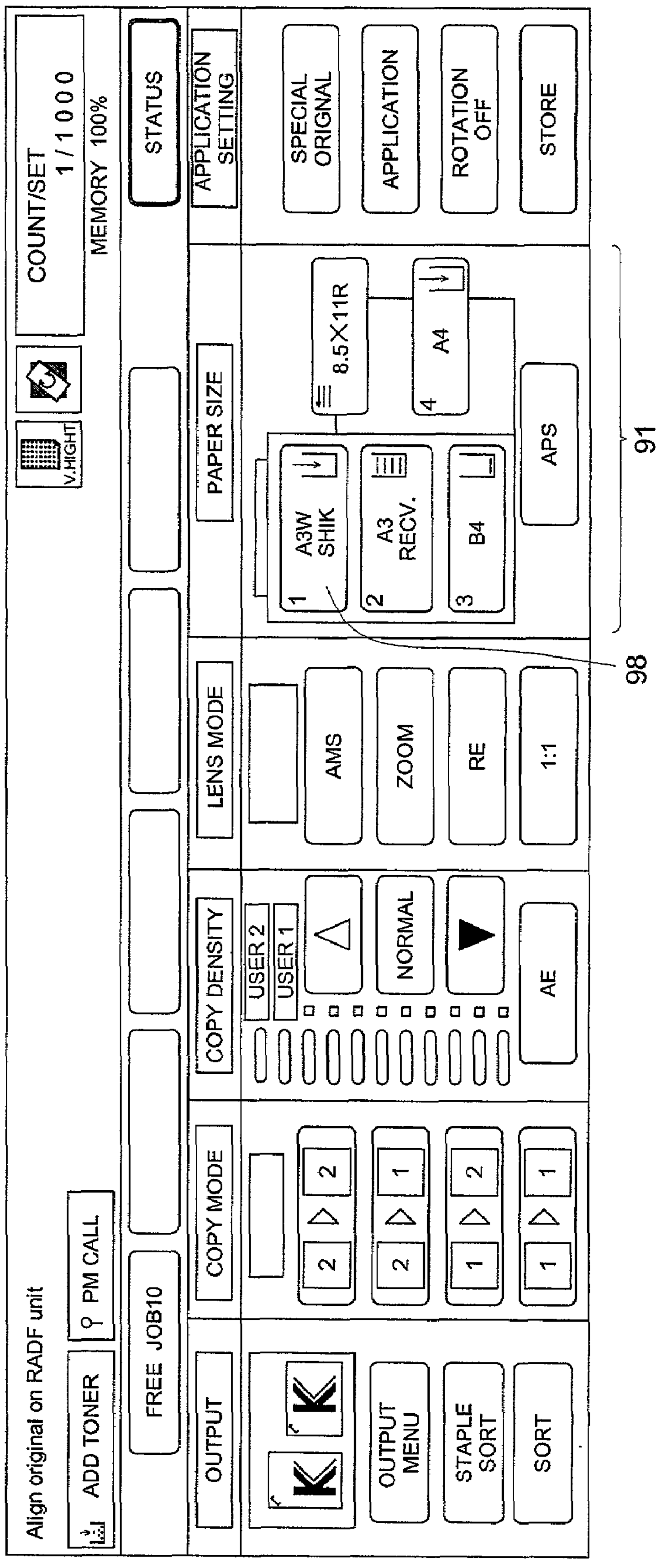
FIG. 8 is an illustration showing the condition of the basic screen similar to FIG. 3 after completion of setting of a wide sheet.

Then, as shown in step S3 in FIG. 5, size input button 95 in pop-up area 93 is specified to make a screen shown in FIG. 7 to appear, and a size (or area) of wide sheet P which is to be set, such as a size in the longitudinal direction and a size in the lateral direction are directly inputted (input of optional sizes). This is a setting process that is generally necessary because a size of wide sheet P is optional, as stated above.

To be concrete, as shown in FIG. 7, longitudinal setting button 96*a* or lateral setting button 96*b* is specified, and then, a longitudinal size and a lateral size (longitudinal length and lateral length, or size in sub-scanning direction and size in main scanning direction) are set by utilizing numeral button area 97. In this case, an initial value of the numeral value displayed in each of the longitudinal and lateral setting buttons 96*a* and 96*b* is one that agrees with a size value of the selected standard fixed-form size stated above. Namely, if "A4' is selected as a standard fixed-form size, for example, "297×210 mm" is displayed, and adjustment, input and setting from its numerical value are conducted.

Further, in the present embodiment, input of this optional size value makes it impossible to conduct setting of size value that is smaller than the selected standard fixed-form size stated above, as shown in step S4 in FIG. 5. For example, when "A4" is selected as a standard fixed-form size, if the setting for the size of "297×210 mm" and less is to be conducted, that setting is rejected. In the present embodiment of this type, erroneous setting by a user of an apparatus can be prevented in advance.

Owing to the operations which have so far been explained above, setting (storing in memory means C2) of sheet feed cassette setting information for a wide sheet for sheet feed cassette $41_1$ is completed. After this setting, the selected standard fixed-form size stated above is displayed on icon 98 representing the sheet feed cassette $41_1$, as shown on the left portion in FIG. 6 or FIG. 7. In the drawing, it is understood that setting of "A3W" (wide sheet whose standard fixed-form size is "A3") has been conducted for sheet feed cassette $41_1$. With regard to the display of this type, the same display is conducted also on the size selection area 91 on the basic screen shown in FIG. 3, as setting information relating to the sheet feed cassette $41_1$. Therefore, a user of the apparatus can confirm the contents of the setting easily.

Incidentally, the standard fixed-form size, the longitudinal length and the lateral length stated above are in the relationship described below. Namely, with regard to a certain wide sheet, when its longitudinal length is 500 mm and a lateral length is 300 mm, these numeral values are inputted in established in step S3 in FIG. 5. However, when a standard fixed-form size is made to be "A3" in the previous step S2, the aforesaid wide sheet is recognized as "A3 wide sheet" (="A3W"), while, when a standard fixed-form size is made to be "A4", the aforesaid wide sheet is recognized as "A4 wide sheet" (="A4W"). Namely, in the present setting process, the selected standard fixed-form size is strictly a "standard" independently of the actual size of transfer sheet P and the transfer sheet P is recognized as "a wide sheet whose standard is the selected standard fixed-form size".

(Image Forming for a Wide Sheet)

When sheet feeding from sheet feed cassette 41 is conducted after "wide sheet setting" for the sheet feed cassette 41 has been completed, a copying apparatus in the present embodiment can conduct image forming for the transfer sheet P.

In this case, first, when conducting actual image forming for wide sheet P in general, it is especially necessary to pay attention to "sheet conveyance conditions" stated above. The reason for the foregoing is that the special consideration differing from that for the fixed-form size is necessary for the timing to start rotation for feed-out roller 43 relating to feeding out of the wide sheet P in transfer sheet conveyance section 40, because a size of a wide sheet is greater than a fixed-form size as stated above.

In the present embodiment, the sheet conveyance conditions of this type are determined basically based on each of the standard fixed-form size, a longitudinal length and a lateral length under the aforesaid setting.

Further, in addition to the transfer sheet P conveyance system stated above, both the conveyance system and other mechanisms (image writing section 20, image forming section 30, etc.) are required to operate jointly under central control means C, in the actual image forming. Therefore, there is sometimes an occasion where each of these mechanisms requires special control conditions because of a wide sheet.

With regard to determination of these control conditions, there will be explained in greater detail three characteristic items in the invention including "1. sheet conveyance conditions based on approximate fixed-form sizes" relating mainly to sheet conveyance conditions, in particular, "2. controls relating to image forming employing AMS functions" in which a mechanism that is out of the conveyance system is also concerned, and "3. controls relating to image forming employing ATS functions".

1. Sheet Conveyance Conditions Based on Approximate Fixed-Form Sizes

A copying apparatus in the present embodiment is characterized in that the copying apparatus is controlled by correcting the sheet conveyance conditions used in conveying "a fixed-form size approximating" an actual size of wide sheet P and by applying them to the sheet conveyance conditions used in conducting image forming for the wide sheet P. In this case, the selection of "a fixed-form size approximating” (hereinafter referred to as “approximate fixed-form size”) is carried out concretely through the following procedures.

First, as shown in step T1 in FIG. 9, the central control means C confirms the aforesaid standard fixed-form size, the longitudinal length and the lateral length which have been set for sheet feed cassette 41 storing wide sheets P to be fed out. Next, based on each value of the longitudinal length and the lateral length both confirmed in the step T1, the central control means C recognizes “a fixed-form size that approximates mostly” the aforesaid value and does not exceed the aforesaid value (hereinafter referred to as “most approximate fixed-form size”), as shown in step T2 in FIG. 9.

To be concrete, when a longitudinal length and a lateral length are set respectively to be 300 mm and 215 mm, with regard to the longitudinal length, “A4” size whose longitudinal length is 297 mm (<300 mm) is recognized as the most approximate fixed-form size. In this case, even with regard to lateral length, “A4” size whose lateral length is 210 mm (<215 mm) is recognized as the most approximate fixed-form size.

Incidentally, the most approximate fixed-form size recognized in this case and the standard fixed-form size confirmed in step T1 do not always agree with each other. For example, when the longitudinal length and the lateral length are set to be “300×215 mm”, the most approximate fixed-form size is recognized as an “A4” size both in the longitudinal direction and the lateral direction as stated above, but there is an occasion where the standard fixed-form size is set to be “B5”.

After completion of the aforesaid process of confirmation and recognition, comparison between the confirmed standard fixed-form size and the recognized most approximate fixed-form size is made for each of the longitudinal direction and the lateral direction, as shown in step T3 in FIG. 9. In this case, if judgment is made to be “the standard fixed-form size=the most approximate fixed-form size”, the standard fixed-form size itself in the aforesaid setting is determined as “fixed-form size approximating” the wide sheet P established, namely as “approximate fixed-form size” introduced in the foregoing (step T41 in FIG. 9). On the other hand, in the case of “the standard fixed-form size” the most approximate fixed-form size”, the most approximate fixed-form size is determined as “approximate fixed-form size” (step T42 in FIG. 9). Incidentally, in general, it can be said that the former judgment is more common. It is possible to consider that the most approximate fixed-form size is determined as an approximate fixed-form size for any of steps T41 and T42 in FIG. 9.

Next, difference values between the longitudinal length and the lateral length both relating to the aforesaid setting and those relating to the approximate fixed-form size are obtained by using the approximate fixed-form size determined in the aforesaid manner, as shown in step T5 in FIG. 9. For example, when the longitudinal length and the lateral length are set to be “300×215 mm”, and the approximate fixed-form size is determined as “A4” in both longitudinal and lateral directions, difference value $\alpha_1$=3 mm (=300−297) relating to the longitudinal direction and difference value $\alpha_2$=5 mm (=215−210) relating to the lateral direction are obtained.

Then, in step T6 in FIG. 9, optimum sheet conveyance conditions for wide sheet P that is looked currently are obtained by the use of sheet conveyance conditions relating to “approximate fixed-form size” determined so far and of “difference values $\alpha_1$ and $\alpha_2$.

Now, if attention is paid to that the approximate fixed-form size surely agrees with “a certain prescribed fixed-form size”, and sheet conveyance conditions relating to “fixed-form size” are already prepared in memory means C2, “sheet conveyance conditions relating to the approximate fixed-form size” can be considered as a given one.

Therefore, for obtaining sheet conveyance conditions optimum for the actual size of wide sheet P, correction by means of the aforesaid difference values $\alpha_1$ and $\alpha_2$ may be conducted for the sheet conveyance conditions relating to the approximate fixed-form size (a certain prescribed fixed-form size). Further, it is possible to consider that the aforesaid correction is generally “addition correction” by difference values $\alpha_1$ and $\alpha_2$, because a size of the wide sheet P must be greater than the approximate fixed-form size without fail. As sheet conveyance conditions, conditions relating to (1) PPM interval control, (2) ADU circulation time control, and (3) control for the detection of a deviation amount for transfer sheets are given as examples, and how these are determined concretely will be explained.

(1) PPM Interval (Print-Per-Minute Interval) Control

First, “PPM” generally means a rate of image forming (copy) completed within a minute for certain transfer sheet P. Next, “PPM interval” means a time interval relating to how to feed out transfer sheet P to be subjected to the succeeding image forming from the second sheet feeding section, in consideration of the rate of image forming completed within a minute. The second sheet feeding section in this case means a standby location for transfer sheet P existing between sheet feed cassette 41 and photoreceptor drum 31 as stated above.

Incidentally, since a size of wide sheet P must be greater than the approximate fixed-form size as stated above, it is necessary to take a prescribed interval equivalent to the difference for conducting accurate feeding out.

Therefore, in the present embodiment, PPM interval $W_{PPM}$ relating to wide sheet P is obtained by using PPM interval $O_{ppm}$ of approximate fixed-form size (this is given as stated above) and difference value $\alpha_1$ relating to the longitudinal direction, from the following expression.

$$W_{PPM}=O_{PPM}+\alpha_1/M \qquad (1)$$

In the expression above, M represents an advancing speed of a transfer sheet P in the direction of transfer sheet conveyance, and it is a “linear speed” which is generally variable corresponding to various control conditions for image forming.

Each of FIGS. 10 (*a*) and 10 (*b*) shows conceptually how these control conditions are determined. FIG. 10 (*a*) is one wherein FIG. 4 is shown again, and it shows that control is carried out so that distance L (mm) between the trailing edge and the leading edge of transfer sheet P may always be constant. FIG. 10 (*b*) shows that control is carried out so that the distance mentioned above may also be L (mm) even for wide sheet P. It is a matter of course that the foregoing is resulted from the correction of PPM interval $O_{PPM}$ made by the use of difference value $\alpha_1$. Incidentally, the control of this type is realized by controlling rotation timing for a conveyance roller in the second sheet feed section.

By doing this, the distance between the trailing edge and the leading edge concerning sheet conveyance is the same as that for the fixed-form size, even in the case of wide sheet P, thus, it is possible to conduct conveyance stably, and to keep the copy productivity at the maximum efficiency.

Incidentally, the condition correction by addition of difference value $\alpha_1$ mentioned above, or the control based on the condition correction can be applied, in exactly the same way, to the timing relating to feeding out of transfer sheet P from sheet feed cassette 41 that is conducted to make the transfer sheet P to arrive at the second sheet feed section stated above, and to the timing for speed change of reversing motor for reversing sheet ejection. Incidentally, the former is realized by conducting rotation control mainly for the aforesaid feed out roller 43, and the latter is realized by conducting rotation control mainly for a roller constituting transfer sheet ejection section 50.

(2) ADU (Auto Duplex Unit) Circulation Time Control

First, transfer sheet reversing section 60 shown in FIG. 1 corresponds concretely to "ADU". The "ADU circulation time" is a period of time for one transfer sheet P covering from the moment when its obverse side comes in contact with photoreceptor drum 31 and image forming is conducted up to the moment when its reverse side comes in contact with the photoreceptor drum 31 through the transfer sheet reversing section 60 and image forming is conducted.

Even in this case, it is necessary to establish conditions for the circulation time suitable for wide sheet P, because a size of the wide sheet P is greater than an approximate fixed-form size, equally to the PPM interval control stated above.

In the present embodiment, therefore, ADU circulation time $W_{ADU}$ relating to wide sheet P to be found is obtained from the following expression, by using ADU circulation time $O_{ADU}$ of an approximate fixed-form size.

$$W_{ADU}=O_{ADU}+(\alpha_1/M_{ADU})\times 2 \tag{2}$$

$M_{ADU}$ in this case is ADU reversing linear speed, and to be concrete, it is determined to be 720 mm/s, for example. With regard to this ADU reversing linear speed, it is used while it is kept to be constant. In the above expression, the reason why the correction term to be added is doubled differently from expression (1) is that the reversing by reversing roller 62 makes transfer sheet P to use the same path twice for going and returning as stated above.

By doing this, it is possible to make ADU circulation control relating to reversing of transfer sheet P to be the same condition as in the fixed-form size even for wide sheet P, and to keep the copy productivity at the maximum efficiency in the same way as in the foregoing.

(3) Detection Control for Transfer Sheet Deviation

In this detection control, a positional deviation of transfer sheet P is detected in advance when it is conveyed for the purpose of estimating how the transfer sheet P is positioned for photoreceptor drum 31, and image forming is prohibited or correction control for a position of image forming for transfer sheet P is conducted by the use of a proper means, when an amount of the positional deviation can not be ignored, for example, when an amount of the positional deviation is recognized to be out of an appropriate range determined in advance. An example of the proper means in this case is a means wherein image writing (electrostatic latent image forming) conducted by a semiconductor laser on photoreceptor drum 31 is adjusted, taking an amount of the aforesaid positional deviation into consideration. Owing to the control of this type, image forming can always be conducted correctly on transfer sheet P.

For detecting the aforesaid positional deviation, sheet position detection sensor 44 shown in FIG. 11, for example, is used. This sheet position detection sensor 44 is provided between photoreceptor drum 31 and the aforesaid second sheet feed section, and when transfer sheet P passes through the sheet position detection sensor 44, a positional deviation in the lateral direction (main scanning direction) of the transfer sheet P is detected.

As shown in FIG. 11, even for this detection of a positional deviation, it is necessary to conduct proper correction based on the standard value relating to an approximate fixed-form size, when detecting accurately the positional deviation concerning wide sheet P. The "standard value" in this case is a value to be detected normally and returned by the positional deviation detection sensor 44 if transfer sheet P is fed out accurately.

In the present embodiment, therefore, positional deviation amount $W_g$ relating to wide sheet P is obtained from the following expression, by using standard value $O_b$ relating to an approximate fixed-form size, difference value $\alpha_2$ in the lateral direction, and actual detection value Q by the sheet position detection sensor 44.

$$W_g=Q-(O_b+\alpha_2/2) \tag{3}$$

In the expression above, terms in parentheses can be regarded as one wherein standard value $W_b$ relating to wide sheet P is obtained based on standard value $O_b$ relating to the approximate fixed-form size through correction of correction value $\alpha_2$. Namely, the expression $W_b=O_b+\alpha_2/2$ holds.

Accordingly, the expression (3) is to obtain positional deviation amount $W_g$ relating to wide sheet P as a value obtained by subtracting standard value $W_b$ relating to wide sheet P from actual detection value Q.

By doing this, it is possible to detect an amount of positional deviation relating to wide sheet P accurately, and to conduct accurate image forming even for the wide sheet P.

As stated above, an appropriate sheet conveyance condition for wide sheet P in the present embodiment can be obtained (step T6 in FIG. 9, see (1)–(3) above) by determining a proper "approximate fixed-form size" for the wide sheet P (steps T1–T41 or T42 in FIG. 9) and by conducting correction employing correction values $\alpha_1$ and $\alpha_2$ (step T5 in FIG. 9) for a sheet conveyance condition (given) relating to the "approximate fixed-form size". Thus, image forming for wide sheet P is conducted based on the appropriate sheet conveyance condition thus obtained, and this sheet conveyance condition can be used as an appropriate one.

Incidentally, in the present embodiment, in particular, it is possible to point out the following effect. Namely, since determination of the approximate fixed-form size for wide sheet P having a given size is made in accordance with steps T1–T41 or T42 in FIG. 9, the determination is always made properly according to an "actual" size of the wide sheet P, even when any "standard fixed-form size" is selected when setting relating to the wide sheet P is conducted. Therefore, a sheet conveyance condition is also determined properly at all times in accordance with an "actual" size of the wide sheet P.

Further, owing to the foregoing, a sheet conveyance condition for wide sheet P having a given size can be obtained properly at all times, if a sheet conveyance condition for a fixed-form size only is prepared in advance. In other words, if a copying apparatus having a control condition considering image forming for a fixed-form size has only to be structured, it is possible to take proper actions based on the aforesaid embodiment for wide sheet P, independently of the size of the wide sheet P.

2. Control Relating to Image Forming Utilizing AMS (Auto Magnification Selection) Function First, an "AMS function" (an automatic magnification selection means) is a means or a function for determining automatically the rate of magnification and the necessity of image rotation in the course of image forming on transfer sheet P for each size of a document, based on a size of the document and a size of transfer sheet P selected to be copied in advance.

To be more concrete, when a size of a document is A3, and a size of transfer sheet P is B5, an image described on the document in A3 size is automatically changed in terms of magnification (reduced in this case) to B5 size, for image forming. The function stated in this paragraph is one relating to the occasion where the aforesaid transfer sheet P is represented by a wide sheet. This will be explained as follows in accordance with an example of work procedures.

As shown in step U1 in FIG. 12, AMS function setting stated above is conducted first. To be concrete, automatic button 99*a* in magnification area 99 in FIG. 3 is specified. Then, as shown in step U2 in FIG. 12, there is started sheet feeding from sheet feed cassette 41 storing wide sheet P.

Next, as shown in step U3 in FIG. 12, central control means C refers to and confirms the sheet feed cassette setting information which is set and stored in memory means C2 with respect to the sheet feed cassette 41, in particular, central control means C refers to and confirms a standard fixed-form size in this case, and regards the "standard fixed-form size" as "a transfer sheet size" in implementation of the AMS function to recognize it.

Concretely, for example, when a size of wide sheet P is set to be 500 mm in the longitudinal direction and 300 mm in the lateral direction, and a standard fixed-form size is made to be "B5", the wide sheet P is regarded as transfer sheet P with a standard fixed-form size of "B5", without considering 500 mm and 300 mm which are the actual lengths in the longitudinal and lateral directions. When the document is in A3 size in this case, determination of magnification for a "transfer sheet to B5 size" is made as shown in FIG. 13, and image forming is conducted based on that determination (steps U4 and U5 in FIG. 12).

However, since a sheet conveyance condition for the wide sheet P is determined as shown in a flow chart in FIG. 9, setting information of standard fixed-form size "B5" is ignored for determination of a sheet conveyance condition, in the aforesaid example. Further, in the case of the foregoing, determination of a control condition for a semiconductor laser in image writing section 20 in addition to sheet conveyance condition for wide sheet P is made based on the description stated above.

As explained above, since an automatic magnification selection function for wide sheet P is conducted as stated above in the present embodiment, a user of an apparatus can conduct more versatile image forming wherein there are considered various binding processes for wide sheet P on which an image has been formed, being coupled with situation that a standard fixed-form size can be set freely (see the above description).

3. Image Forming Utilizing ATS (Auto Tray Switching) Function

First, "ATS function" (an automatic storing deck switching means) is a means or a function wherein there is conducted continuous sheet feeding from sheet feed cassette 41 (hereinafter referred to as "preceding sheet feed cassette" for convenience sake) storing transfer sheet P having a certain size, and when transfer sheets P stored in the preceding sheet cassette 41 are all used up in the case of continuous image forming for the transfer sheet P, if another sheet feed cassette 41 (hereinafter referred to as "succeeding sheet feed cassette") storing transfer sheet P having the same condition, for example, the same size in general, is present, switching to the succeeding sheet feed cassette 41 is carried out automatically. The function described in this paragraph is one relating to the occasion where wide sheet P is stored in the preceding sheet feed cassette 41. This will be explained as follows in accordance with an example of work procedures.

First, as shown in step V1 in FIG. 14, the ATS function stated above is set. Then, as shown in step V2 in FIG. 14, sheet feeding from sheet feed cassette 41 storing wide sheet P is started and actual image forming is carried out. Incidentally, in this image forming, a sheet conveyance condition in the copying apparatus is determined based on sheet feed cassette setting information established in the preceding sheet feed cassette 41, namely, on the standard fixed-form size, the longitudinal length and the lateral length, in this case.

As shown in step V3 in FIG. 14, after this sheet feeding and image forming, it is checked whether wide sheets P in the preceding sheet feed cassette 41 have been used up or not. When the wide sheets P in the preceding sheet feed cassette 41 have been used up, central control means C confirms the standard fixed-form size, the longitudinal length and the lateral length which are set in the preceding sheet feed cassette 41, and searches sheet feed cassette 41 in which a standard fixed-form size, a longitudinal length and a lateral length which agree exactly with the aforesaid standard fixed-form size, the longitudinal length and the lateral length stated above are set.

If sheet feed cassette 41 which agrees exactly with the preceding sheet feed cassette 41 in terms of setting is present, this is made to be succeeding sheet feed cassette 41, and switching is automatically conducted so that wide sheet P may be fed out of the succeeding sheet feed cassette 41, thus, the image forming is continued (step V5 in FIG. 14). On the othere hand, if sheet feed cassette 41 which agrees exactly is not present, sheet feeding for wide sheet P is stopped, and copying is suspended (step END in FIG. 14).

By doing the foregoing, unnecessary errors of an apparatus can be prevented.

As explained above, the image forming apparatus of the invention makes it possible to set easily even for any recording materials each having a size greater than the standard fixed-form size, and to carry out image forming for images with high quality, or image forming under high productivity.

Disclosed embodiment can be varied by a skilled person without departing from the spirit and scope of the invention.

What is claimed is:

1. An image-forming apparatus for forming an image on a wide recording material, which is wider than a corresponding standard fixed-form size recording material having a predetermined fixed-form size, based on an original image recorded on a document, said apparatus comprising:

a plurality of recording material storing units, each of which is adapted to store a type of recording material;

an input section for inputting information regarding a size of said types of recording material stored in said recording material storing units as setting information corresponding respectively to said recording material storing units;

a memory section to store said setting information corresponding to each of said recording material storing units; and a control section to determine controlling conditions based on said setting information and to control operations of said image-forming apparatus based on said controlling conditions;

wherein said setting information corresponding to the wide recording material includes said predetermined fixed-form size of said corresponding standard fixed-form size recording material that is narrower than the wide recording material and longitudinal and lateral lengths of said wide recording material;

wherein inputting the setting information corresponding to the wide recording material includes a first step of inputting said predetermined fixed-form size of said corresponding standard fixed-form size recording material into said input section, and a second step of inputting said longitudinal and lateral lengths of said wide recording material into said input section; and wherein, when said longitudinal and lateral lengths inputted at said second step are shorter than longitudinal and lateral lengths of said standard fixed-form size recording material inputted at said first step, said input section rejects the inputting operation of said longitudinal and lateral lengths.

2. The image-forming apparatus of claim 1, wherein said input section establishes the types of said recording material as said setting information corresponding respectively to said recording material storing units.

3. The image-forming apparatus of claim 1, further comprising:

a displaying section to display said setting information in a manner such that each item of said setting information clearly corresponds to the corresponding one of said recording material storing units.

4. The image-forming apparatus of claim 3, wherein said displaying section displays information in regard to said predetermined fixed form size of said standard fixed-form size recording material and information of size larger than said predetermined fixed-form size.

5. The image-forming apparatus according to claim 1, further comprising:

an automatic magnification selecting section to automatically determine a magnification factor utilized for forming said image on said wide recording material, based on (i) said predetermined fixed form size of said standard fixed-form size recording material corresponding to said wide recording material and (ii) a size of said document, with respect to each dimension of said document.

6. The image-forming apparatus of claim 5, wherein said input section establishes the types of said recording material as said setting information corresponding respectively to said recording material storing units.

7. The image-forming apparatus according to claim 1, further comprising:

an automatic storing unit switching section to automatically switch a feeding path of said recording material from a current recording material storing unit to another feeding path from another recording material storing unit that stores a same type of recording material as said current recording material storing unit, when said current recording material storing unit is emptied during consecutive image-forming operations for said same type of recording material;

wherein when said recording material is said wide recording material, it is determined that said another recording material storing unit stores said same type of recording material based on said predetermined fixed-form size of said corresponding standard fixed-form size recording Material and said longitudinal and lateral lengths of said wide recording material.

8. The image-forming apparatus of claim 7, wherein said input section establishes the types of said recording material as said setting information corresponding respectively to said recording material storing units.

9. An image-forming apparatus for forming an image on a wide recording material, which is wider than a corresponding standard fixed-form size recording material having a predetermined fixed-form size, based on an original image recorded on a document, said apparatus comprising:

a plurality of recording material storing units, each of which is adapted to store a type of recording material;

an input section for inputting information regarding a size of said types of recording material stored in said recording material storing units as setting information corresponding respectively to said recording material storing units;

a memory section to store said setting information corresponding to each of said recording material storing units; and a control section to determine conveyance controlling conditions, for determining a conveyance mode of said types of recording material fed from said recording material storing units, based on the corresponding setting information, and to control operations of said image-forming apparatus based on said determined conveyance controlling conditions;

wherein said setting information corresponding to the wide recording material includes said predetermined fixed-form size of said corresponding standard fixed-form size recording material that is narrower than the wide recording material and longitudinal and lateral lengths of said wide recording material, and said conveyance controlling conditions for the wide recording material are determined based on said longitudinal and lateral lengths of said wide recording material;

wherein inputting the setting information corresponding to the wide recording material includes a first step of inputting said predetermined fixed-form size of said corresponding standard fixed-form size recording material into said input section, and a second step of inputting said longitudinal and lateral lengths of said wide recording material into said input section; and wherein, when said longitudinal and lateral lengths inputted at said second step are shorter than longitudinal and lateral lengths of said standard fixed-form size recording material inputted at said first step, said input section rejects the inputting operation of said longitudinal and lateral lengths.

10. The image-forming apparatus of claim 9, wherein said input section establishes the types of said recording material as said setting information corresponding respectively to said recording material storing devices.

11. The image-forming apparatus of claim 9, wherein said control section calculates an approximate fixed-form size corresponding to the wide recording material such that longitudinal and lateral lengths of the approximate fixed-form size are approximate to, and do not exceed, said longitudinal and lateral lengths of the wide recording material, and said control section calculates said conveyance controlling conditions for the wide recording material based on conveyance controlling conditions corresponding to said approximate fixed-form size.

12. The image-forming apparatus of claim 11, wherein said conveyance controlling conditions corresponding to said approximate fixed-form size are given in advance.

13. The image-forming apparatus of claim 11, wherein said approximate fixed-form size is separately determined with respect to each of longitudinal and lateral directions.

14. The image-forming apparatus of claim 11, wherein said control section compares said predetermined fixed-form size of said standard fixed-form size recording material with a most approximate fixed-form size, having longitudinal and lateral lengths that are most approximate to, and do not exceed, said longitudinal and lateral lengths of the wide recording material, and wherein said control section determines said predetermined fixed-form size of said standard fixed-form size recording material as said approximate fixed-form size when said predetermined fixed-form size of said standard fixed-form size recording material is equal to said most approximate fixed-form size, and determines said most approximate fixed-form size as said approximate fixed-form size when said predetermined fixed-form size of said standard fixed-form size recording material is smaller than said most approximate fixed-form size.

15. An image-forming apparatus, for forming an image on a wide recording material, which is wider than a corresponding standard fixed-form size recording material having a predetermined fixed-form size, based on an original image recorded on a document, said apparatus comprising:

a plurality of recording material storing units, each of which is adapted to store a type of recording material;

an input section for inputting information regarding a size of said types of recording material stored in said recording material storing units as setting information corresponding respectively to said recording material storing units;

a memory section to store said setting information corresponding to each of said recording material storing units; and a control section to determine conveyance controlling conditions, for determining a conveyance mode of said types of recording material fed from said recording material storing units, based on the corresponding setting information, and to control operations of said image-forming apparatus based on said determined conveyance controlling conditions;

wherein said setting information corresponding to the wide recording material includes said predetermined fixed-form size of said corresponding standard fixed-form size recording material that is narrower than the wide recording material and longitudinal and lateral lengths of said wide recording material, and said conveyance controlling conditions for the wide recording material are determined based on said longitudinal and lateral lengths of said wide recording material;

wherein said control section calculates an approximate fixed-form size corresponding to the wide recording material such that longitudinal and lateral lengths of the approximate fixed-form size are approximate to, and do not exceed, said longitudinal and lateral lengths of the wide recording material, and said control section calculates said conveyance controlling conditions for the wide recording material based on conveyance controlling conditions corresponding to said approximate fixed-form size; and wherein said control section calculates said conveyance controlling conditions for the wide recording material based on difference values between the longitudinal and lateral lengths of said wide recording material and the longitudinal and lateral lengths of said approximate fixed-form size in longitudinal and lateral directions, respectively.

16. The image-forming apparatus of claim 15, wherein said control section calculates said conveyance controlling conditions for the wide recording material by compensatively adding said difference values to said conveyance controlling conditions corresponding to said approximate fixed-form size.

17. The image-forming apparatus of claim 16, wherein said control section calculates said conveyance controlling conditions in respect to a PPM interval control by utilizing said difference values in said longitudinal direction.

18. The image-forming apparatus of claim 16, wherein said control section calculates said conveyance controlling conditions in respect to an ADU circulation control by utilizing said difference values in said longitudinal direction.

19. The image-forming apparatus of claim 16, wherein said control section calculates said conveyance controlling conditions in respect to a controlling operation for detecting a positional deviation of said recording material by utilizing said difference values in said lateral direction.

* * * * *